United States Patent
Jiang et al.

(10) Patent No.: US 9,843,463 B2
(45) Date of Patent: Dec. 12, 2017

(54) DATA SENDING METHOD, APPARATUS, AND DEVICE, AND DATA RECEIVING METHOD, APPARATUS, AND DEVICE

(71) Applicant: HUAWEI TECHNOLOGIES CO., LTD., Shenzhen (CN)

(72) Inventors: Tao Jiang, Wuhan (CN); Dejin Kong, Wuhan (CN); Wenjia Cui, Wuhan (CN); Guangmei Ren, Chengdu (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/379,907

(22) Filed: Dec. 15, 2016

(65) Prior Publication Data

US 2017/0099164 A1 Apr. 6, 2017

Related U.S. Application Data

(63) Continuation of application No. PCT/CN2014/080314, filed on Jun. 19, 2014.

(51) Int. Cl.
*H04L 25/03* (2006.01)
*H04L 5/00* (2006.01)

(52) U.S. Cl.
CPC ........ *H04L 25/03019* (2013.01); *H04L 5/005* (2013.01)

(58) Field of Classification Search
CPC .... H04L 25/03; H04L 25/03019; H04L 5/005
See application file for complete search history.

(56) References Cited

U.S. PATENT DOCUMENTS

2009/0257518 A1  10/2009  Lele et al.
2016/0099822 A1*  4/2016  Thein .................... H04L 5/0051
                                                                   375/260
(Continued)

FOREIGN PATENT DOCUMENTS

CN  101043479 A  9/2007
CN  101110630 A  1/2008
(Continued)

OTHER PUBLICATIONS

TaeWoong Yoon et al., "Pilot Structure for high Data Rate in OFDM/OQAM-IOTA System," Vehicular Technology Conference, 2008-Fall, IEEE, Piscataway, NJ, USA, Sep. 21, 2008, pp. 1-5.
(Continued)

*Primary Examiner* — Jaison Joseph

(57) ABSTRACT

A transmit end determines M first time-frequency resource locations and S second time-frequency resource locations, and determines, in the S second time-frequency resource locations, S/2 second time-frequency resource locations as a first set, and S/2 second time-frequency resource locations excluding the second time-frequency resource locations in the first set as a second set; determines a communication data symbol sent at the second time-frequency resource locations in the first set; obtains, a compensation data symbol sent at the second time-frequency resource locations in the second set, where interference of the communication data symbol to the pilot data symbol cancels out interference of the compensation data symbol to the pilot data symbol; and separately sends the pilot data symbol at the M first time-frequency resource locations, and sends the communication data symbol and the compensation data symbol at the S second time-frequency resource locations.

15 Claims, 7 Drawing Sheets

(56) References Cited

U.S. PATENT DOCUMENTS

2017/0026215 A1* 1/2017 Zhao .................. H04L 25/0224
2017/0099172 A1* 4/2017 Ren ..................... H04L 27/264

FOREIGN PATENT DOCUMENTS

CN          101997805 A     3/2011
CN          102761506 A    10/2012

OTHER PUBLICATIONS

Adrian Kliks et al., "Power Loading for FBMC Systems: An Analysis with Mercury-filling Approach," ICT 2013, IEEE, May 6, 2013, pp. 1-5.

International Search Report (including English translation) issued in corresponding International Application No. PCT/CN2014/080314, dated Mar. 20, 2015, 6 pages.

Extended European Search Report issued in corresponding EP Application No. 14895317, dated May 23, 2017, 11 pages.

* cited by examiner

Multicarrier symbol number

FIG. 1B

Multicarrier symbol number

FIG. 1C

Multicarrier symbol number

FIG. 1D

Multicarrier symbol number 0    1

Subcarrier number
0
1
2
3
4
5

FIG. 1E

DATA SENDING METHOD, APPARATUS, AND DEVICE, AND DATA RECEIVING METHOD, APPARATUS, AND DEVICE

CROSS-REFERENCE TO RELATED APPLICATIONS

This application is a continuation of International Application No. PCT/CN2014/080314, filed on Jun. 19, 2014, the disclosure of which is hereby incorporated by reference in its entirety.

TECHNICAL FIELD

The present disclosure relates to the field of communications technologies, and more specifically, to a data sending method, a data receiving method, a data sending apparatus, a data sending device, a data receiving apparatus, and a data receiving device.

BACKGROUND

In a wireless communications system, distortion may be caused after communication data passes a channel. To resist impact of a radio channel on transmitted data, channel estimation at a receive end is indispensible. In a multicarrier system, a pilot-based channel estimation solution is generally used. A pilot is known data. A transmit end sends a pilot, and a receive end implements, according to received data, channel estimation at a location at which the pilot is sent.

However, the inventor finds in research that in a multicarrier system, especially in a system meeting only a condition of orthogonality in a real number field, a pilot sent by a transmit end may be interfered with by data sent around the pilot. Therefore, data received by a receive end is not a simple product of a channel and the pilot. For example, without considering demodulation noise at the receive end, the received data is specifically a product of the channel and a sum of the pilot and a pilot interference term, and consequently a channel estimation value obtained by means of calculation is inaccurate.

SUMMARY

Embodiments of the present disclosure provide a data sending method and a data receiving method and a device that is associated with the methods.

According to a first aspect, a data sending method is provided. The method may include:

determining, in a time-frequency resource by a transmit end, M first time-frequency resource locations and S second time-frequency resource locations in a preset neighborhood of the M first time-frequency resource locations, where S=2M;

determining, in the S second time-frequency resource locations, S/2 second time-frequency resource locations as a first set, and S/2 second time-frequency resource locations excluding the second time-frequency resource locations in the first set as a second set;

determining a communication data symbol sent at the second time-frequency resource locations in the first set, and calculating, according to the communication data symbol, a compensation data symbol sent at the second time-frequency resource locations in the second set, where interference of the communication data symbol to the pilot data symbol cancels out interference of the compensation data symbol to the pilot data symbol; and separately sending the pilot data symbol at the M first time-frequency resource locations, sending the communication data symbol at the second time-frequency resource locations in the first set, and sending the compensation data symbol at the second time-frequency resource locations in the second set.

According to a second aspect, a data receiving method is provided. The method may include:

receiving, by a receive end, a data symbol at a time-frequency resource location to which a pilot sequence is mapped, where the pilot sequence has M first time-frequency resource locations and S second time-frequency resource locations, the S second time-frequency resource locations are located in a preset neighborhood of the M first time-frequency resource locations, and S=2M; in the S second time-frequency resource locations, S/2 second time-frequency resource locations are a first set, and S/2 second time-frequency resource locations excluding the first location set are a second set; and a transmit end sends the pilot data symbol at the M first time-frequency resource locations, sends the communication data symbol at the S/2 second time-frequency resource locations in the first set, and sends the compensation data symbol at the S/2 second time-frequency resource locations in the second set, where interference of the communication data symbol to the pilot data symbol cancels out interference of the compensation data symbol to the pilot data symbol;

performing channel estimation according to the received data symbol and the pilot data symbol, to obtain a channel estimation value; and obtaining, by using the channel estimation value and according to data obtained by means of demodulation at the second time-frequency resource locations in the first set and/or data obtained by means of demodulation at the second time-frequency resource locations in the second set, communication data corresponding to the communication data symbol.

According to a third aspect, a data device is provided. The data device may include a memory, a transmitter, and a processor, where the memory stores a group of program instructions, and the processor invokes the program instructions stored in the memory to execute the following operations that may include:

determining, in a time-frequency resource, M first time-frequency resource locations and S second time-frequency resource locations in a preset neighborhood of the M first time-frequency resource locations, wherein S=2M;

determining, in the S second time-frequency resource locations, S/2 second time-frequency resource locations as a first set, and S/2 second time-frequency resource locations excluding the second time-frequency resource locations in the first set as a second set;

determining a communication data symbol sent at the second time-frequency resource locations in the first set, and calculating, according to the communication data symbol, a compensation data symbol sent at the second time-frequency resource locations in the second set, wherein interference of the communication data symbol to the pilot data symbol cancels out interference of the compensation data symbol to the pilot data symbol; and triggering the transmitter to separately send the pilot data symbol at the M first time-frequency resource locations, send the communication data symbol at the second time-frequency resource locations in the first set, and send the compensation data symbol at the second time-frequency resource locations in the second set.

It is to be understood that the foregoing general description and the following detailed description are exemplary and explanatory only and are not restrictive of the present disclosure, as claimed.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely the embodiments of the present disclosure, and a person of ordinary skill in the art may still derive other drawings from these accompanying drawings without creative efforts.

FIG. 1a to FIG. 1e are separately possible schematic diagrams of time-frequency resource location distribution in an embodiment of the present disclosure;

Figure 1:
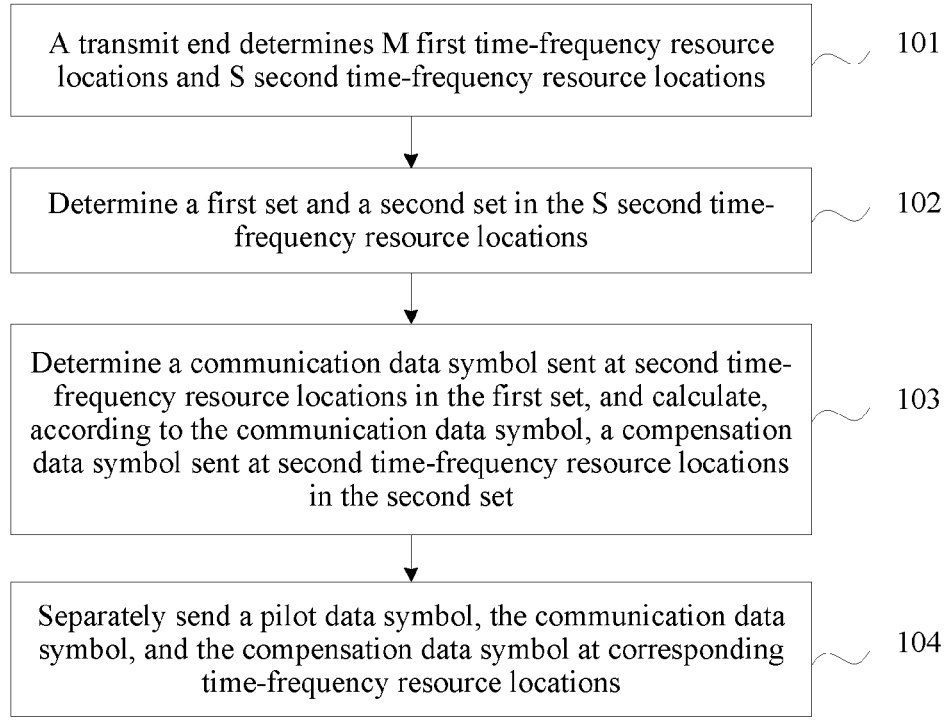
FIG. 1 is a flowchart of an embodiment of a data sending method according to an embodiment of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

The technical solutions of the present disclosure are mainly applied to a multicarrier system using a multicarrier technology, especially to a multicarrier system meeting only a condition of orthogonality in a real number field, for example, an FBMC (filter bank multicarrier) system. With advantages such as a good outband suppression effect, high frequency spectrum utilization, and flexible frequency spectrum use, the FBMC system is known as one of candidate technologies for next-generation mobile communications.

The FBMC system meets only the condition of orthogonality in a real number field, and because of such orthogonality in the real number field, when received at a receive end, a pilot data symbol sent by a transmit end is not a simple product of a channel and the pilot data symbol but a product of the channel and a sum of the pilot data symbol and a pilot interference term of the pilot data symbol. Therefore, a pilot design method and a channel estimation method in the FBMC system need to be taken into particular consideration.

In the embodiments of the present disclosure, M first time-frequency resource locations and S second time-frequency resource locations in a preset neighborhood of the M first time-frequency resource locations are determined; a pilot data symbol is sent at the M first time-frequency resource locations; and a communication data symbol is sent at second time-frequency resource locations in a first set in the S second time-frequency resource locations, and a compensation data symbol is sent at second time-frequency resource locations in a second set in the S second time-frequency resource locations, where interference of the communication data symbol to the pilot data symbol cancels out interference of the compensation data symbol to the pilot data symbol. In this way, during channel estimation, because the interference of the communication data symbol to the pilot data symbol cancels out the interference of the compensation data symbol to the pilot data symbol, a pilot interference term is 0, so that a receive end can obtain a relatively clean received data symbol, and can directly obtain an accurate channel estimation value according to the received data symbol and the pilot data symbol. In addition, by using a constructed pilot sequence, some communication data may be transmitted, so that the some communication data sent by a transmit end can be demodulated according to the communication data symbol and the compensation data symbol in the pilot sequence, which improves data demodulation performance, fully utilizes a pilot resource, and can reduce overheads.

FIG. 1 is a flowchart of an embodiment of a data sending method according to an embodiment of the present disclosure. The method may include the following several steps.

101. A transmit end determines, in a time-frequency resource, M first time-frequency resource locations and S second time-frequency resource locations in a preset neighborhood of the M first time-frequency resource locations.

In a radio communication process, a time-frequency resource that is used may be divided into multiple resource elements. A resource element is the smallest unit of the time-frequency resource to carry a data symbol. A location of each time-frequency resource element on a time-frequency resource grid is a time-frequency resource location. Alternatively, the time-frequency resource may be divided in terms of a frequency domain and a time domain. In the time domain, the time-frequency resource may be divided into multiple multicarrier symbols. Each multicarrier symbol may be divided into multiple subcarriers in the frequency domain. Each subcarrier in each multicarrier symbol represents a resource element. Therefore, the time-frequency resource location may further be represented by using coordinates (m,n), where m represents a frequency-domain number of the resource element, that is, a subcarrier number, and n represents a time-domain number of the resource element, that is, a multicarrier symbol number.

After being modulated, to-be-transmitted data is mapped to a time-frequency resource location of each subcarrier for sending. The mapped modulated data is referred to as a data symbol.

A location of a data symbol carried by each resource element may be represented by using a time-frequency resource location. For example, a data symbol is sent at a time-frequency resource location (0, 0), which indicates that the data symbol is sent on the zeroth subcarrier of the zeroth multicarrier symbol.

Figure 1A:
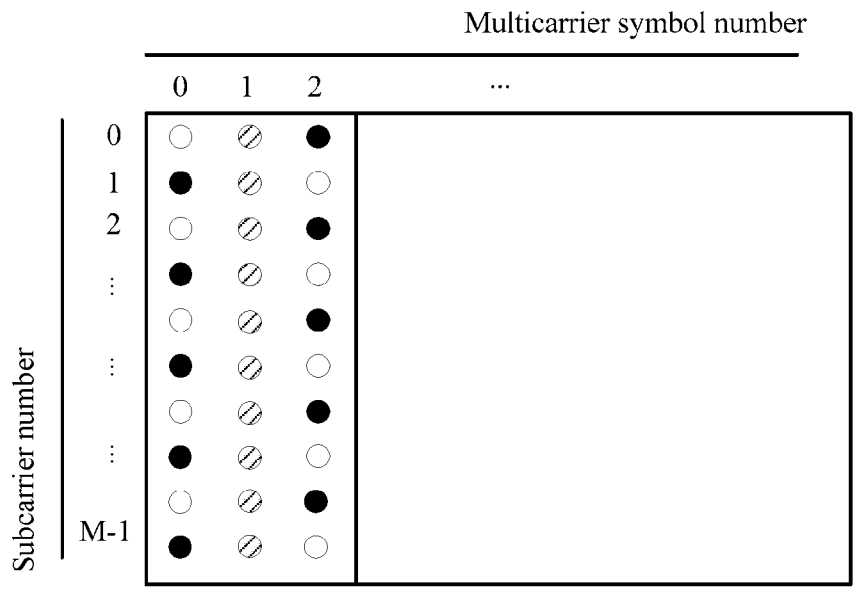

FIG. 1a shows a schematic diagram of time-frequency resource location distribution. In FIG. 1a, each column represents one multicarrier symbol. A row number represents a subcarrier number with values of 0, 1, 2, . . . , and a column number represents a multicarrier symbol number with values of 0, 1, 2, . . . . Each coordinate location is a time-frequency resource location.

In this embodiment of the present disclosure, in the time-frequency resource, the M first time-frequency resource locations and the S second time-frequency resource locations in the preset neighborhood of the M first time-frequency resource locations are first determined. The M first time-frequency resource locations are used to transmit a pilot data symbol. Therefore, values of S and M are specifically determined according to a quantity of pilot data symbols sent in actual application, where S=2M.

After a pilot is modulated and mapped to a time-frequency resource location, the mapped modulated pilot is referred to as a pilot data symbol. In pilot-based channel estimation, the pilot data symbol refers to a data symbol preset by the transmit end and a receive end for channel estimation.

It should be noted that, in this embodiment of the present disclosure, "first" and "second" in a first time-frequency resource location and in a second time-frequency resource location are merely for differentiating time-frequency resource locations, and does not indicate a sequence nor another substantive relationship.

102. Determine, in the S second time-frequency resource locations, S/2 second time-frequency resource locations as a first set, and S/2 second time-frequency resource locations excluding the second time-frequency resource locations in the first set as a second set.

103. Determine a communication data symbol sent at the second time-frequency resource locations in the first set, and calculate, according to the communication data symbol, a compensation data symbol sent at the second time-frequency resource locations in the second set, where interference of the communication data symbol to the pilot data symbol cancels out interference of the compensation data symbol to the pilot data symbol.

The communication data symbol is a data symbol transmitted in a process of communication between the transmit end and the receive end.

The communication data symbol and the compensation data symbol are data symbols sent around the pilot data symbol. Interference of the communication data symbol and the compensation data symbol to the pilot data symbol forms a pilot interference term of the pilot data symbol. Therefore, the interference of the communication data symbol to the pilot data symbol cancels out the interference of the compensation data symbol to the pilot data symbol means that the pilot interference term is 0.

The compensation data symbol is obtained by means of calculation according to the communication data symbol and according to a principle that the interference of the communication data symbol to the pilot data symbol cancels out the interference of the compensation data symbol to the pilot data symbol.

The interference of the communication data symbol and the compensation data symbol to the pilot data symbol is related to their respective time-frequency resource locations. S/2 second time-frequency resource locations may be randomly selected from the S second time-frequency resource locations as the first set, as long as it is ensured that when the communication data symbol is sent at the second time-frequency resource locations in the first set and the compensation data symbol is sent at the second time-frequency resource locations in the second set, the interference of the communication data symbol to the pilot data symbol cancels out the interference of the compensation data symbol to the pilot data symbol.

104. Separately send the pilot data symbol at the M first time-frequency resource locations, send the communication data symbol at the second time-frequency resource locations in the first set, and send the compensation data symbol at the second time-frequency resource locations in the second set.

That is, the pilot data symbol is mapped to the M first time-frequency resource locations for sending, the communication data symbol is mapped to the S/2 second time-frequency resource locations in the first set for sending, and the compensation data symbol is mapped to the S/2 second time-frequency resource locations in the second set for sending.

A time-frequency resource corresponding to the M first time-frequency resource locations and the S second time-frequency resource locations is a constructed pilot sequence.

When the compensation data symbol is determined, the pilot data symbol, the communication data symbol, and the compensation data symbol may be sent. The interference of the communication data symbol to the pilot data symbol cancels out the interference of the compensation data symbol to the pilot data symbol, that is, the pilot interference term is 0, so that the receive end can obtain relatively clean data, and can implement accurate channel estimation. In addition, in a process of sending the pilot data symbol, the transmit end sends the communication data symbol at the same time, so that the receive end can receive some communication data, which improves data demodulation performance, fully utilizes a pilot resource, and therefore can reduce pilot overheads.

The S second time-frequency resource locations are located in the preset neighborhood of the M first time-frequency resource locations. The preset neighborhood may refer to an area in which a time-frequency resource location that causes interference to the M first time-frequency resource locations is located.

Therefore, the determining S second time-frequency resource locations in a preset neighborhood of the M first time-frequency resource locations may be specifically: determining the S second time-frequency resource locations that cause interference to the M first time-frequency resource locations. That is, a data symbol sent at the S second time-frequency resource locations causes interference to a data symbol sent at the M first time-frequency resource locations.

There may be multiple time-frequency resource locations that cause interference to the M first time-frequency resource locations. Therefore, in a possible implementation manner, the S second time-frequency resource locations may be determined according to a multiplexing converter response in time-frequency resource locations corresponding to a first preset range of the multiplexing converter response of the M first time-frequency resource locations.

In another possible implementation manner, the S second time-frequency resource locations may be determined according to an interference coefficient table in time-frequency resource locations corresponding to a second preset range of the interference coefficient table of the M first time-frequency resource locations.

The multiplexing converter response indicates interference, when the transmit end is directly connected to the receive end, of a data symbol sent at a time-frequency resource location to a data symbol sent at a time-frequency resource location around the time-frequency resource location. Specifically, when the transmit end sends a data symbol 1 at a time-frequency resource location, and does not send a data symbol at another time-frequency resource location, data symbols received at time-frequency resource locations by the receive end are values of a multiplexing converter response of a system.

A time-frequency resource table formed by corresponding values of the multiplexing converter response of the receive end at the time-frequency resource locations is referred to as the multiplexing converter response of the system, which is shown in the following Table 1:

TABLE 1

| Subcarrier number | Multicarrier symbol number | | |
| --- | --- | --- | --- |
| | −1 | 0 | 1 |
| −1 | 0.2280j | −0.4411j | 0.2280j |
| 0 | −0.4411j | 1 | −0.4411j |
| 1 | 0.2280j | −0.4411j | 0.2280j |

In Table 1, a row represents a subcarrier number in a frequency domain, and a column represents a multicarrier symbol number in a time domain. Table 1 represents data symbols received by the receive end at all time-frequency resource locations when the transmit end sends a data symbol 1 at a time-frequency resource location (0, 0) and sends a data symbol 0 at other time-frequency resource locations.

A multiplexing converter response table can reflect an interference range and an interference value of the system. For example, in the system shown in Table 1, a data symbol is sent at the time-frequency resource location (0, 0), and the sent data symbol causes interference both to two subcarriers vertically adjacent to the time-frequency resource location (0, 0) and to two multicarrier symbols horizontally adjacent to the time-frequency resource location (0, 0). Therefore, an interference range of the data symbol sent at the time-frequency resource location (0, 0) is 3×3. Actually, an interference value also exists beyond the 3×3 interference range. However, a ratio of the interference value beyond the range to a total interference power is relatively small and may be ignored.

In this case, according to Table 1, multiplexing response data of the data symbol sent by the transmit end at the time-frequency resource location (0, 0) with respect to a time-frequency resource location corresponding to a subcarrier number 1 and a multicarrier symbol number −1 is 0.2280j. Therefore, the time-frequency resource location (−1, 1) receives interference with a size of 0.2280j from the time-frequency resource location (0, 0).

The interference coefficient table may be obtained according to the multiplexing converter response. The interference coefficient table represents interference caused by a data symbol sent at a time-frequency resource location around a time-frequency resource location to a data symbol sent at the time-frequency resource location, which is shown in Table 2:

TABLE 2

| Subcarrier number | Multicarrier symbol number | | |
| --- | --- | --- | --- |
| | −1 | 0 | 1 |
| −1 | 0.2280j | 0.4411j | 0.2280j |
| 0 | −0.4411j | 1 | 0.4411j |
| 1 | 0.2280j | −0.4411j | 0.2280j |

In Table 2, a row represents a subcarrier number in a frequency domain, and a column represents a multicarrier symbol number in a time domain. Table 2 represents interference coefficient values with respect to the time-frequency resource location (0, 0) that are generated when a data symbol 1 is sent at a time-frequency resource location (m, n).

For example, the transmit end sends the data symbol 1 at a time-frequency resource location corresponding to a subcarrier number −1 and a multicarrier symbol number −1, and at the receive end, an interference coefficient value with respect to a central time-frequency resource location, that is, the location (0, 0), is 0.2280j. Therefore, the central time-frequency resource location receives interference with a size of 0.2280j from the location (−1, −1).

Therefore, it can be learned from the foregoing description that, a time-frequency resource location that falls within a specific range and causes interference to the M first time-frequency resource locations may be determined according to the multiplexing converter response or the interference coefficient table, and the time-frequency resource location may be used as the second time-frequency resource location.

The first preset range and the second preset range may be the same or may be different.

In still another possible implementation manner, the preset neighborhood may be preset. Therefore, specifically, the S second time-frequency resource locations may be constructed according to a system-preset parameter in time-frequency resource locations that cause interference to the M first time-frequency resource locations.

For example, a 3×3 range of each time-frequency resource location in the M first time-frequency resource locations is the preset neighborhood.

In this embodiment of the present disclosure, the determined M first time-frequency resource locations may be specifically time-frequency resource locations corresponding to N consecutive multicarrier symbols, and are corresponding to M/N consecutive subcarriers. That is, in a time-frequency resource corresponding to the M first time-frequency resource locations, each multicarrier symbol is corresponding to M/N consecutive subcarriers, numbers of the N multicarrier symbols are consecutive, and numbers of the M/N subcarriers in each multicarrier symbol are also consecutive.

The S second time-frequency resource locations are corresponding to T multicarrier symbols, and corresponding to S/T subcarriers. That is, in a time-frequency resource corresponding to the S second time-frequency resource locations, each multicarrier symbol is corresponding to the S/T subcarriers, the T multicarrier symbols may be not necessarily consecutive, and the S/T subcarriers in each multicarrier symbol may be not necessarily consecutive subcarriers, either.

Therefore, there are multiple possible implementation manners of distribution of the M first time-frequency resource locations and the S second time-frequency resource locations. The following examples describe several possible cases. It should be noted that the present disclosure is not limited thereto.

In a possible implementation manner, the T multicarrier symbols are multicarrier symbols corresponding to numbers sequentially adjacent to numbers of the N consecutive multicarrier symbols. In this case, M/N=S/T.

The T multicarrier symbols and the N consecutive multicarrier symbols form consecutive multicarrier symbols. It may be that T/2 multicarrier symbols in the T multicarrier symbols are multicarrier symbols corresponding to T/2 consecutive numbers adjacent to a smallest number in the N consecutive multicarrier symbols, and remaining T/2 multicarrier symbols are multicarrier symbols corresponding to T/2 consecutive numbers adjacent to a largest number in the N consecutive multicarrier symbols.

In the N+T multicarrier symbols, subcarrier numbers of different multicarrier symbols are correspondingly the same.

FIG. 1b and FIG. 1c show schematic diagrams of two types of time-frequency resource location distribution in this possible implementation manner.

In FIG. 1b, N is 1, M is 4, S is 8, and T is 2. One multicarrier symbol has four subcarriers. Values of multicarrier symbol numbers are 0, 1, and 2, and values of subcarrier numbers are 0, 1, 2, and 3. Each circle in the figure represents one time-frequency resource location, and is corresponding to one subcarrier of one multicarrier symbol. A time-frequency resource location is represented as (m,n).

First time-frequency resource locations are time-frequency resource locations corresponding to a multicarrier symbol numbered 1, and second time-frequency resource locations are time-frequency resource locations corresponding to multicarrier symbols numbered 0 and 2.

The multicarrier symbol 0 and the multicarrier symbol 2 are respectively located on either side of the multicarrier symbol 1.

Each multicarrier symbol has a same quantity of subcarriers, and all the subcarriers are subcarriers corresponding to numbers 0, 1, 2, and 3.

Pilot data symbols are sent at the first time-frequency resource locations, and are represented by shaded circles. Communication data symbols and compensation data symbols are separately sent at the second time-frequency resource locations, where a first set is represented by black circles, and a second set is represented by white circles. The first set includes second time-frequency resource locations {(0, 2), (1, 0), (2, 2), (3, 0)}, and the second set includes second time-frequency resource locations {(0, 0), (1, 2), (2, 0), (3, 2)}.

It can be learned from FIG. 1b, the time-frequency resource locations in the first set and the time-frequency resource locations in the second set are alternately distributed. That is, communication data symbols and compensation data symbols are alternately sent in time-frequency resource locations corresponding to one multicarrier symbol.

In the multicarrier symbol 0, communication data symbols are mapped to time-frequency resource locations of subcarriers 1 and 3 for sending, and compensation data symbols are mapped to time-frequency resource locations of subcarriers 0 and 2 for sending.

In the multicarrier symbol 2, communication data symbols are mapped to time-frequency resource locations of subcarriers 0 and 2 for sending, and compensation data symbols are mapped to time-frequency resource locations of subcarriers 1 and 3 for sending.

In FIG. 1c, N is 2, M is 8, S is 16, and T is 4. One multicarrier symbol has four subcarriers. Values of multicarrier symbol numbers are 0, 1, 2, 3, 4, and 5, and values of subcarrier numbers are 0, 1, 2, and 3.

First time-frequency resource locations are time-frequency resource locations corresponding to multicarrier symbols numbered 2 and 3, and second time-frequency resource locations are time-frequency resource locations corresponding to multicarrier symbols numbered 0, 1, 4, and 5. A first set includes second time-frequency resource locations {(m,n), m=0, 1, 2, 3, n=4, 5}, and a second set includes second time-frequency resource locations {(m,n), m=0, 1, 2, 3, n=0, 1}.

Numbers of the multicarrier symbols 0, 1, 4, and 5 are sequentially adjacent to numbers of multicarrier symbols 2 and 3.

Each multicarrier symbol has a same quantity of subcarriers, and all the subcarriers are subcarriers corresponding to numbers 0, 1, 2, and 3.

It can be learned from FIG. 1c that, communication data symbols are mapped to second time-frequency resource locations corresponding to multicarrier symbols 4 and 5 for sending, and compensation data symbols are mapped to second time-frequency resource locations corresponding to multicarrier symbols 0 and 1 for sending.

Certainly, the present disclosure is not limited to a distribution method shown in FIG. 1c, and there may be another distribution method. For example, pilot data symbols occupy two columns of multicarrier symbols, which are respectively located in the multicarrier symbols 2 and 3. Both compensation data symbols and communication data symbols are located in the multicarrier symbols 0, 1, 4, and 5, and are alternately sent on subcarriers of each multicarrier symbol.

In another possible implementation manner, the T multicarrier symbols are the same as the N multicarrier symbols. In each multicarrier symbol, S/T subcarriers that are corresponding to second time-frequency resource locations are subcarriers corresponding to numbers sequentially adjacent to numbers of M/N subcarriers that are corresponding to first time-frequency resource locations, where T=N.

The S/T subcarriers and the M/N consecutive subcarriers form consecutive subcarriers in a same multicarrier symbol. It may be that S/2T subcarriers in the T multicarrier symbols are subcarriers corresponding to S/2T consecutive numbers adjacent to a smallest number in the M/N consecutive subcarriers, and remaining S/2T subcarriers are subcarriers corresponding to S/2T consecutive numbers adjacent to a largest number in the M/N consecutive subcarriers.

FIG. 1d and FIG. 1e show schematic diagrams of two types of time-frequency resource location distribution in this possible implementation manner.

In FIG. 1d, T=N=2, M=2, and S=4. One multicarrier symbol has three subcarriers. Values of multicarrier symbol numbers are 0 and 1, and values of subcarrier numbers are 0, 1, and 2.

First time-frequency resource locations are time-frequency resource locations corresponding to a subcarrier 1 in multicarrier symbols 0 and 1, and second time-frequency resource locations are time-frequency resource locations corresponding to subcarriers 0 and 2 in the multicarrier symbols 0 and 1. A first set includes second time-frequency resource locations {(0, 1), (2, 0)}, and a second set includes second time-frequency resource locations {(0, 0), (2, 1)}.

In each multicarrier symbol, numbers of the subcarriers 0 and 2 are two numbers sequentially adjacent to a number of the subcarrier 1.

In the multicarrier symbols 0 and 1, pilot data symbols are mapped to time-frequency resource locations of the subcarrier 1 for sending.

In the multicarrier symbol 0, a communication data symbol is mapped to a time-frequency resource location of the subcarrier 2 for sending, and a compensation data symbol is mapped to a time-frequency resource location of the subcarrier 0 for sending.

In the multicarrier symbol 1, a communication data symbol is mapped to a time-frequency resource location of the subcarrier 0 for sending, and a compensation data symbol is mapped to a time-frequency resource location of the subcarrier 2 for sending.

In FIG. 1e, T=N=2, M=4, and S=8. One multicarrier symbol includes 6 subcarriers. Values of multicarrier symbol numbers are 0 and 1, and values of subcarrier numbers are 0, 1, 2, 3, 4, and 5.

First time-frequency resource locations are time-frequency resource locations corresponding to subcarriers 2 and 3 in multicarrier symbols 0 and 1, and second time-frequency resource locations are time-frequency resource locations corresponding to subcarriers 0, 1, 4, and 5 in the multicarrier symbols 0 and 1.

A first set includes second time-frequency resource locations {(m,n), m=4, 5, n=0, 1}, and a second set includes second time-frequency resource locations {(m,n), m=0, 1, n=0, 1}.

In each multicarrier symbol, numbers of the subcarriers 0, 1, 4, and 5 are numbers sequentially adjacent to numbers of the subcarriers 2 and 3.

In the multicarrier symbols 0 and 1, pilot data symbols are mapped to time-frequency resource locations of the subcarriers 2 and 3 for sending.

In the multicarrier symbols 0 and 1, communication data symbols are mapped to time-frequency resource locations of the subcarriers 4 and 5 for sending, and compensation data symbols are mapped to time-frequency resource locations of the subcarriers 0 and 1 for sending.

It should be noted that, the present disclosure is not limited to time-frequency resource location distribution in FIG. 1b to FIG. 1e, and is not limited to distribution situations of a first set and a second set in FIG. 1b to FIG. 1e, either. Time-frequency resource locations separately corresponding to the first set and the second set may be switched or changed as long as it is ensured that when a communication data symbol is sent in the first set, interference of the communication data symbol to the pilot data symbol cancels out interference of the compensation data symbol to the pilot data symbol.

Figure 2:
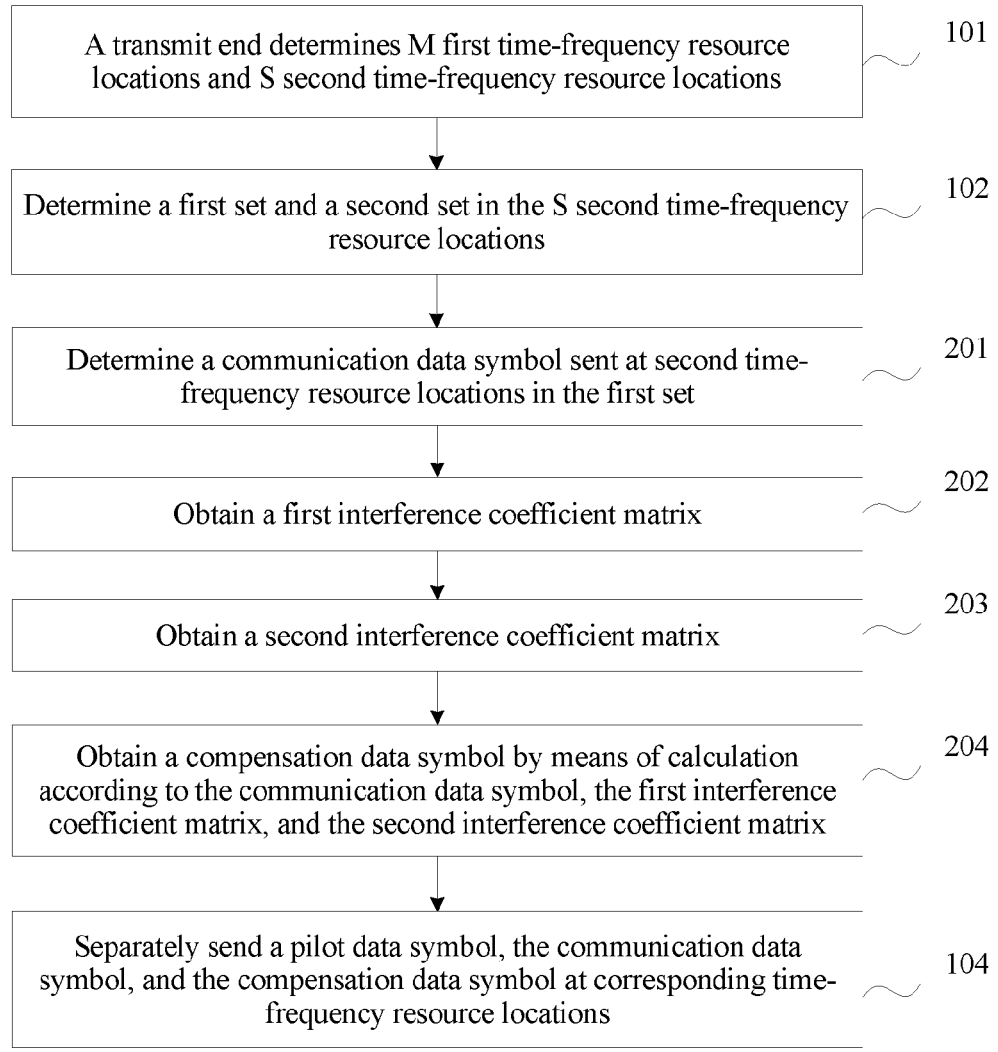
FIG. 2 is a flowchart of another embodiment of a data sending method according to an embodiment of the present disclosure.

FIG. 2 is a flowchart of another embodiment of a data sending method according to an embodiment of the present disclosure. For steps 101, 102, and 104 in this method, refer to the embodiment shown in FIG. 1. A difference from the embodiment shown in FIG. 1 lies in that step 103 may include the following steps:

201. Determine a communication data symbol sent at second time-frequency resource locations in a first set.

202. Obtain a first interference coefficient matrix formed by interference coefficients of interference caused by the second time-frequency resource locations in the first set to the M first time-frequency resource locations.

203. Obtain a second interference coefficient matrix formed by interference coefficients of interference caused by the second time-frequency resource locations in the second set to the M first time-frequency resource locations.

204. Obtain a compensation data symbol by means of calculation according to the communication data symbol, the first interference coefficient matrix, and the second interference coefficient matrix, so that interference of the communication data symbol to the pilot data symbol cancels out interference of the compensation data symbol to the pilot data symbol.

A location relationship between a first time-frequency resource location and a second time-frequency resource location is known. Therefore, an interference coefficient of interference caused to a data symbol sent at the first time-frequency resource location when data symbols are sent in the first set and the second set may be determined according to a multiplexing converter response or an interference coefficient table.

The first interference coefficient matrix corresponding to the first set, and the second interference coefficient matrix corresponding to the second set may be obtained according to an interference coefficient of the second time-frequency resource location that causes interference to each first time-frequency resource location.

When the first interference coefficient matrix, the second interference coefficient matrix, and the communication data symbol are known, the compensation data symbol can be obtained by means of calculation according to a principle that the interference of the communication data symbol to the pilot data symbol cancels out the interference of the compensation data symbol to the pilot data symbol.

During pilot-based channel estimation, it is assumed that a pilot data symbol sent by a transmit end at a time-frequency resource location $(m_0, n_0)$ is $a_{m_0 n_0}$, where $m_0$ is a subcarrier number, and $n_0$ is a multicarrier symbol number.

A data symbol received by a receive end at the time-frequency resource location $(m_0, n_0)$ approximates to:

$$r_{m_0 n_0} \approx H_{m_0 n_0} \left( a_{m_0 n_0} + \sum_{(m,n) \in \Omega_{m_0 n_0}} a_{mn} \zeta_{(m-m_0, n-n_0)} \right) + \eta_{m_0 n_0}$$

where $$\sum_{(m,n) \in \Omega_{m_0 n_0}} a_{mn} \zeta_{(m-m_0, n-n_0)}$$

is a pilot interference term of the pilot data symbol $a_{m_0 n_0}$; $\Omega_{m_0 n_0}$ represents a set of time-frequency resource locations that cause interference to the time-frequency resource location $(m_0, n_0)$; $a_{mn}$ represents a data symbol that is sent at a time-frequency resource location $(m,n)$ and that causes interference to $a_{m_0 n_0}$; $H_{m_0 n_0}$ represents a frequency-domain channel coefficient at the time-frequency resource location $(m_0, n_0)$ $\zeta_{(m-m_0, n-n_0)}$ represents a value of an interference coefficient of the data symbol transmitted at the time-frequency resource location $(m,n)$ with respect to pilot data sent at the time-frequency resource location $(m_0, n_0)$, where the value may be determined according to the multiplexing converter response or the interference coefficient table; and $\eta_{m_0 n_0}$ is demodulation noise at the receive end.

The channel estimation value approximates to:

$$\hat{H}_{m_0 n_0} \approx \frac{r_{m_0 n_0}}{a_{m_0 n_0} + \sum_{(m,n) \in \Omega_{m_0 n_0}} a_{mn} \zeta_{(m-m_0, n-n_0)}}.$$

In this embodiment of the present disclosure, the interference of the communication data symbol to the pilot data symbol cancels out the interference of the compensation data symbol to the pilot data symbol, that is, a pilot interference term of the pilot data symbol is 0, so that the receive end can obtain a relatively clean pilot, and can obtain a relatively accurate channel estimation value.

To simplify a calculation process, a matrix may be used to calculate the pilot interference term. In this embodiment of the present disclosure, it is assumed that a pilot data symbol sent at the M first time-frequency resource locations is represented as p, and that interference coefficients of interference caused to all pilot data symbols may form an interference coefficient matrix.

Therefore, without considering demodulation noise, a data symbol set received by the receive end at the M first time-frequency resource locations may be represented as:

$$y_p = H(p + M_d d + M_c c).$$

The interference term of the pilot data symbol is:

$M_d d + M_c c$, where $M_d$ represents the first interference coefficient matrix, $M_c$ represents the second interference coefficient matrix, d represents a communication data symbol sent at the second time-frequency resource locations in the first set, and c represents a compensation data symbol sent at the second time-frequency resource locations in the second set. H represents a frequency-domain channel coefficient set at the M first time-frequency resource locations.

Therefore, $M_d d + M_c c = 0$, and the compensation data symbol c can be obtained by means of calculation.

To better understand the technical solutions of the present disclosure, an example is used for description. For example, T multicarrier symbols corresponding to the second time-frequency resource locations are multicarrier symbols corresponding to numbers sequentially adjacent to numbers of N consecutive multicarrier symbols corresponding to the first time-frequency resource locations, where M/N=S/T.

It is assumed that N=1 and T=2, and time-frequency resource location distribution is shown in FIG. 1a. Each time-frequency resource location is represented as (m,n), where m represents a subcarrier number with values 0, 1, . . . , and M−1, and n represents a multicarrier symbol number with values of 0, 1, and 2. A data symbol sent at each time-frequency resource location may be represented as $a_{mn}$.

First time-frequency resource locations are time-frequency resource locations corresponding to a multicarrier symbol 1, and are represented by shaded circles, and second time-frequency resource locations are time-frequency resource locations corresponding to multicarrier symbols 0 and 2. A first set includes time-frequency resource locations corresponding to subcarriers 1, 3, 5, . . . in the multicarrier symbol 0, and time-frequency resource locations corresponding to subcarriers 0, 2, 4, . . . in the multicarrier symbol 2, and are represented by black circles. A second set includes time-frequency resource locations corresponding to subcarriers 0, 2, 4, . . . in the multicarrier symbol 0, and time-frequency resource locations corresponding to subcarriers 1, 3, 5, . . . in the multicarrier symbol 2, and are represented by white circles. That is, in one multicarrier symbol, time-frequency resource locations in the first set and the second set are alternately distributed.

FIG. 1a includes three columns of multicarrier symbols, and other columns of multicarrier symbols can properly transmit other communication data symbols in a process of communication between a transmit end and a receive end.

A pilot data symbol is mapped to M subcarrier time-frequency resource locations in the multicarrier symbol 1 for sending. A communication data symbol is mapped to time-frequency resource locations corresponding to the first set in the multicarrier symbols 0 and 2 for sending. A compensation data symbol is mapped to time-frequency resource locations corresponding to the second set in the multicarrier symbols 0 and 2.

The pilot data symbol is represented as:

$p = [p_0 \ p_1 \ \ldots \ p_{M-1}]^T.$

The communication data symbol is represented as:

$d = [d_0 \ d_1 \ \ldots \ d_{M-1}]^T.$

The compensation data symbol is represented as:

$c = [c_0 \ c_1 \ \ldots \ c_{M-1}]^T.$

With reference to the time-frequency resource location distribution in FIG. 1a, it can be learned that the pilot data symbol $p_m = a_{m1}$, where m=0, 1, 2, . . . , and M−1.

The communication data symbol $d_{2k}=a_{2k,2}$, and $d_{2k+1}=a_{2k+1,0}$, where k=0, 1, ..., and $$\frac{M}{2}-1.$$

The compensation data symbol $c_{2k}=a_{2k,0}$, and $c_{2k+1}=a_{2k+1,2}$, where k=0, 1, ..., and $$\frac{M}{2}-1.$$

The first interference coefficient matrix may be represented as:

$$M_d = \begin{pmatrix} \xi_{02}^{01} & \xi_{10}^{01} & 0 & \cdots & \xi_{(M-1)0}^{01} \\ \xi_{02}^{11} & \xi_{10}^{11} & \xi_{22}^{11} & \cdots & 0 \\ 0 & \xi_{10}^{21} & \xi_{22}^{21} & \cdots & 0 \\ \vdots & \vdots & \vdots & \ddots & \vdots \\ \xi_{02}^{(M-1)1} & 0 & 0 & \cdots & \xi_{(M-1)0}^{(M-1)1} \end{pmatrix};$$

and
the second interference coefficient matrix may be represented as:

$$M_c = \begin{pmatrix} \xi_{00}^{01} & \xi_{12}^{01} & 0 & \cdots & \xi_{(M-1)2}^{01} \\ \xi_{00}^{11} & \xi_{12}^{11} & \xi_{20}^{11} & \cdots & 0 \\ 0 & \xi_{12}^{21} & \xi_{20}^{21} & \cdots & 0 \\ \vdots & \vdots & \vdots & \ddots & \vdots \\ \xi_{00}^{(M-1)1} & 0 & 0 & \cdots & \xi_{(M-1)2}^{(M-1)1} \end{pmatrix},$$

where
$\xi_{ij}^{mn}$ represents a value of an interference coefficient of a data symbol sent at a time-frequency resource location (i, j) with respect to a data symbol sent at a time-frequency resource location (m,n).

A frequency-domain channel coefficient matrix is represented as:

$$H = \begin{pmatrix} H_0 & \cdots & 0 \\ \vdots & \ddots & \vdots \\ 0 & \cdots & H_{M-1} \end{pmatrix},$$

where
$H_m$ represents a frequency-domain channel coefficient of a subcarrier m corresponding to the first time-frequency resource locations.

Therefore, the compensation data symbol can be obtained by means of calculation by using $M_d d + M_c c = 0$.

During channel estimation, if demodulation noise is not considered:

$$\hat{H}_m \approx \frac{y_{pm}}{p_m},$$

where
$y_{pm}$ represents a received data symbol on the $m^{th}$ subcarrier in a multicarrier symbol corresponding to the first time-frequency resource locations, $p_m$ represents a pilot data symbol sent on the $m^{th}$ subcarrier, and $\hat{H}_m$ represents a channel estimation value on the $m^{th}$ subcarrier.

Because the interference of the communication data symbol to the pilot data symbol cancels out the interference of the compensation data symbol to the pilot data symbol, a pilot interference term of a pilot data symbol on each subcarrier is 0, so that a channel estimation value on each subcarrier can be obtained:

$$\hat{H}_m \approx H_m.$$

A system may preset the first interference coefficient matrix and the second interference coefficient matrix according to the first time-frequency resource locations and the second time-frequency resource locations.

There may be multiple possible implementation manners of distribution of the first time-frequency resource locations and the second time-frequency resource locations. Therefore, the system may also preset interference coefficient matrices corresponding to multiple types of different distribution of the first time-frequency resource locations and the second time-frequency resource locations. In this way, when a pilot is sent, a corresponding first interference coefficient matrix and second interference coefficient matrix may be found according to currently determined first time-frequency resource locations and second time-frequency resource locations.

Certainly, the system may also separately construct the first interference coefficient matrix and the second interference coefficient matrix according to the currently determined first time-frequency resource locations and second time-frequency resource locations, and a multiplexing converter response or an interference coefficient table.

It should be noted that the distribution of the first time-frequency resource locations and the second time-frequency resource locations, and the determining of the first set and the second set for the second time-frequency resource locations are not limited in the present disclosure as long as it is ensured that a quantity of communication data symbols and a quantity of compensation data symbols that are sent at time-frequency resource locations are separately equal to that of pilot data symbols, and it is additionally ensured that the second interference coefficient matrix is an invertible matrix, and that a product of an inverse matrix of the second interference coefficient matrix and the first interference coefficient matrix is an invertible matrix.

In this embodiment of the present disclosure, M first time-frequency resource locations and S second time-frequency resource locations in a preset neighborhood of the M first time-frequency resource locations are determined; a pilot data symbol is sent at the M first time-frequency resource locations; and a communication data symbol is sent at time-frequency resource locations in a first set in the S second time-frequency resource locations, and a compensation data symbol is sent at time-frequency resource locations in a second set in the S second time-frequency resource locations, where interference of the communication data symbol to the pilot data symbol cancels out interference of the compensation data symbol to the pilot data symbol. In this way, during channel estimation, because the interference of the communication data symbol to the pilot data symbol cancels out the interference of the compensation data symbol to the pilot data symbol, a pilot interference term is 0, so that a receive end receives relatively clean data, and can obtain a relatively accurate channel estimation value.

In addition, by using a constructed pilot sequence, some communication data between a transmit end and the receive end may be transmitted, so that the some communication data sent by the transmit end can be demodulated according to the communication data symbol and the compensation data symbol in the pilot sequence, which improves data demodulation performance and fully utilizes a pilot resource.

Figure 3:
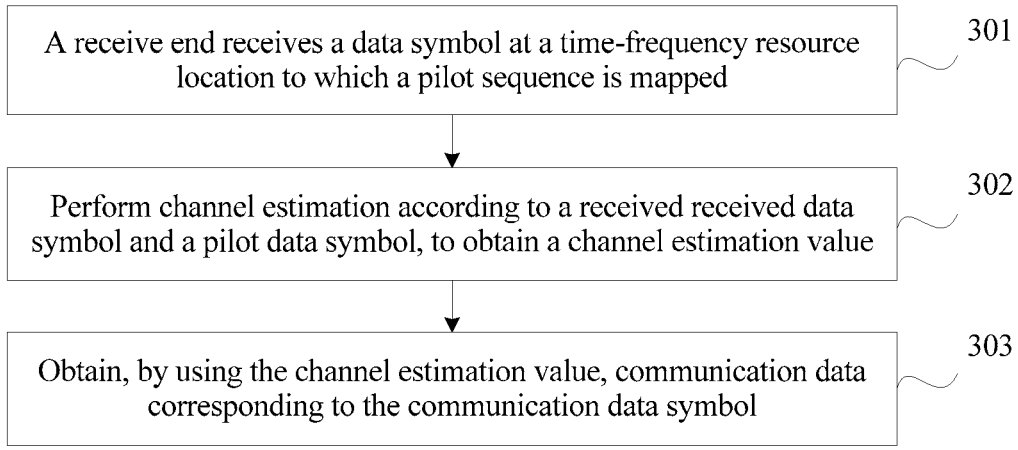
FIG. 3 is a flowchart of an embodiment of a data receiving method according to an embodiment of the present disclosure.

FIG. 3 is a flowchart of an embodiment of a data receiving method according to an embodiment of the present disclosure. The method may include the following several steps.

301. A receive end receives a data symbol at a time-frequency resource location to which a pilot sequence is mapped.

The pilot sequence has M first time-frequency resource locations and S second time-frequency resource locations, the S second time-frequency resource locations are located in a preset neighborhood of the M first time-frequency resource locations, and S=2M; in the S second time-frequency resource locations, S/2 second time-frequency resource locations are a first set, and S/2 second time-frequency resource locations excluding the first location set are a second set; and a transmit end sends the pilot data symbol at the M first time-frequency resource locations, sends the communication data symbol at the S/2 second time-frequency resource locations in the first set, and sends the compensation data symbol at the S/2 second time-frequency resource locations in the second set, where interference of the communication data symbol to the pilot data symbol cancels out interference of the compensation data symbol to the pilot data symbol.

302. Perform channel estimation according to the received data symbol and the pilot data symbol, to obtain a channel estimation value.

The transmit end sends the pilot data symbol at the first time-frequency resource locations, sends the communication data symbol at the time-frequency resource locations in the first set in the second time-frequency resource locations, and sends the compensation data symbol at the time-frequency resource locations in the second set in the second time-frequency resource locations.

If demodulation noise is not considered, the channel estimation value is:

$$\hat{H}_m \approx \frac{y_{pm}}{p_m},$$

where $y_{pm}$ represents a data symbol received on the $m^{th}$ subcarrier of a multicarrier symbol, $p_m$ represents a pilot data symbol sent on the $m^{th}$ subcarrier, and $\hat{H}_m$ represents a channel estimation value on the $m^{th}$ subcarrier.

Because the interference of the communication data symbol to the pilot data symbol cancels out the interference of the compensation data symbol to the pilot data symbol, a pilot interference term of a pilot data symbol on each subcarrier is 0, so that a channel estimation value on each subcarrier can be obtained:

$\hat{H}_m \approx H_m$, where $H_m$ represent a frequency-domain channel coefficient on a subcarrier m in a multicarrier symbol.

303. Obtain, by using the channel estimation value and according to data obtained by means of demodulation at the second time-frequency resource locations in the first set and/or data obtained by means of demodulation at the second time-frequency resource locations in the second set, communication data corresponding to the communication data symbol.

The communication data symbol sent by the transmit end may be a data symbol transmitted in a process of communication between the transmit end and the receive end. The compensation data symbol is a data symbol obtained by means of calculation by using the communication data symbol. Therefore, by using the channel estimation value, the receive end may demodulate a data symbol that is received at a time-frequency resource location to which the communication data symbol is mapped, and obtained first demodulation data may be used as the communication data corresponding to the communication data symbol.

Alternatively, the receive end may demodulate a data symbol that is received at a time-frequency resource location to which the compensation data symbol is mapped, and obtain, by means of calculation according to obtained compensation demodulation data, the communication data corresponding to the communication data symbol.

That is, the receive end obtains a second demodulation data of the communication data symbol by means of calculation by using the compensation demodulation data, and interference coefficients of the communication data symbol and the compensation data symbol with respect to the pilot data symbol. The second demodulation data may also be used as the communication data corresponding to the communication data symbol sent by the transmit end.

Specifically, according to a relationship between the communication data symbol and the compensation data symbol $M_d d + M_c c = 0$, a relationship between the compensation demodulation data and the second demodulation data may be determined, that is:

$M_d \tilde{d} + M_c \tilde{c} = 0$, where $M_d$ represents a first interference coefficient matrix formed by interference coefficients of interference caused by the communication data symbol to the pilot data symbol, $M_c$ represents a second interference coefficient matrix formed by interference coefficients of interference caused by the compensation data symbol to the pilot data symbol, $\tilde{d}$ represents the second demodulation data, and $\tilde{c}$ represents the compensation demodulation data.

The first interference coefficient matrix and the second interference coefficient matrix may be preset by a system, or may be sent by the transmit end, or may be constructed by the receive end according to a received pilot sequence, and a multiplexing converter response or an interference coefficient table.

According to the compensation demodulation data obtained by means of demodulation, the second demodulation data may be obtained by means of calculation according to the foregoing formula. The second demodulation data may also be used as the communication data corresponding to the communication data symbol.

Certainly, in still another possible implementation manner, to reduce impact of interference and noise, improve an SNR (signal to noise ratio) of received data, and improve system demodulation performance, the first demodulation data and the compensation demodulation data may be separately obtained by means of demodulation, and the second demodulation data is obtained by means of calculation by using the compensation demodulation data; and weighted combination is performed on the first demodulation data and the second demodulation data, to obtain the communication data corresponding to the communication data symbol, where a sum of weighted combination coefficients is 1, and generally values of the weighted combination coefficients each may be ½.

In this embodiment of the present disclosure, interference of a communication data symbol sent by a transmit end to a pilot data symbol cancels out interference of a compensation data symbol sent by the transmit end to the pilot data symbol, that is, a pilot interference term is 0, so that relatively clean received data can be obtained, and an accurate channel estimation value can be obtained.

In addition, by using a constructed pilot sequence, some communication data between the transmit end and a receive end may be transmitted, so that the some communication data sent by the transmit end can be demodulated according to the communication data symbol and the compensation data symbol in the pilot sequence, which improves data demodulation performance, fully utilizes a pilot resource, and can reduce pilot overheads to some extent.

For ease of description, each of the foregoing methods is described as a combination of a series of actions. However, a person skilled in the art should understand that the present disclosure is not limited to the order of the described actions because some steps according to the present disclosure may be performed in another order or performed simultaneously. In addition, a person skilled in the art should also appreciate that all the embodiments described in this specification are exemplary embodiments, and the related actions and modules are not necessarily mandatory to the present disclosure.

Figure 4:
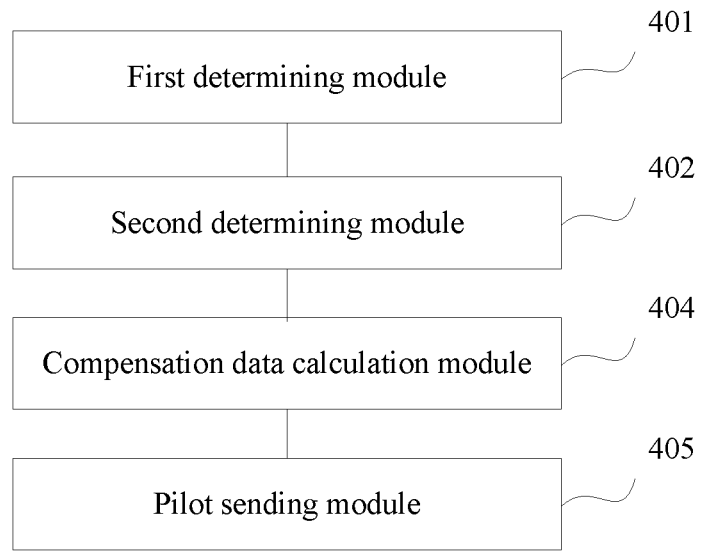
FIG. 4 is a schematic structural diagram of an embodiment of a data sending apparatus according to an embodiment of the present disclosure.

FIG. 4 is a schematic structural diagram of a data sending apparatus of an embodiment according to an embodiment of the present disclosure. The apparatus may include:

a first determining module 401, configured to determine, in a time-frequency resource, M first time-frequency resource locations and S second time-frequency resource locations in a preset neighborhood of the M first time-frequency resource locations, where S=2M;

a second determining module 402, configured to determine, in the S second time-frequency resource locations, S/2 second time-frequency resource locations as a first set, and S/2 second time-frequency resource locations excluding the second time-frequency resource locations in the first set as a second set;

a compensation data calculation module 403, configured to: determine a communication data symbol sent at the second time-frequency resource locations in the first set, and calculate, according to the communication data symbol, a compensation data symbol sent at the second time-frequency resource locations in the second set, where interference of the communication data symbol to the pilot data symbol cancels out interference of the compensation data symbol to the pilot data symbol; and a pilot sending module 404, configured to: separately send the pilot data symbol at the M first time-frequency resource locations, send the communication data symbol at the second time-frequency resource locations in the first set, and send the compensation data symbol at the second time-frequency resource locations in the second set.

The communication data symbol is a data symbol that needs to be transmitted in a process of communication between a transmit end and a receive end.

The interference of the communication data symbol to the pilot data symbol cancels out the interference of the compensation data symbol to the pilot data symbol, so that the receive end can obtain relatively clean received data, and can implement accurate channel estimation. In addition, in a process of sending a pilot, the transmit end sends the communication data symbol at the same time, so that the receive end can receive some communication data, which improves data demodulation performance, and fully utilizes a pilot resource, and therefore can reduce pilot overheads.

There may be multiple implementation manners in which the first determining module 401 determines the S second time-frequency resource locations in the preset neighborhood of the M first time-frequency resource locations.

That the first determining module 401 determines S second time-frequency resource locations in a preset neighborhood of the M first time-frequency resource locations may be:

determining the S second time-frequency resource locations that cause interference to the M first time-frequency resource locations.

In a possible implementation manner, that the first determining module 401 determines the S second time-frequency resource locations that cause interference to the M first time-frequency resource locations may be: determining, according to a multiplexing converter response, the S second time-frequency resource locations in time-frequency resource locations corresponding to a first preset range of the multiplexing converter response of the M first time-frequency resource locations.

In another possible implementation manner, that the first determining module 401 determines the S second time-frequency resource locations that cause interference to the M first time-frequency resource locations may be: determining, according to an interference coefficient table, the S second time-frequency resource locations in time-frequency resource locations corresponding to a second preset range of the interference coefficient table of the M first time-frequency resource locations.

In still another possible implementation manner, that the first determining module 401 determines the S second time-frequency resource locations that cause interference to the M first time-frequency resource locations may be: determining, according to a system preset parameter, the S time-frequency resource locations that cause interference to the M first time-frequency resource locations.

For the multiplexing converter response and the interference coefficient table, refer to the descriptions in the method embodiments, and details are not described herein again.

The M first time-frequency resource locations may be corresponding to N consecutive multicarrier symbols, and corresponding to M/N consecutive subcarriers; and the S second time-frequency resource locations may be corresponding to T multicarrier symbols, and corresponding to S/T subcarriers, where the T multicarrier symbols are multicarrier symbols corresponding to numbers sequentially adjacent to numbers of the N consecutive multicarrier symbols, and M/N=S/T; or T=N, the T multicarrier symbols are the N multicarrier symbols, and in each multicarrier symbol, S/T subcarriers that are corresponding to second time-frequency resource locations are subcarriers corresponding to numbers sequentially adjacent to numbers of M/N subcarriers that are corresponding to first time-frequency resource locations.

Figure 5:
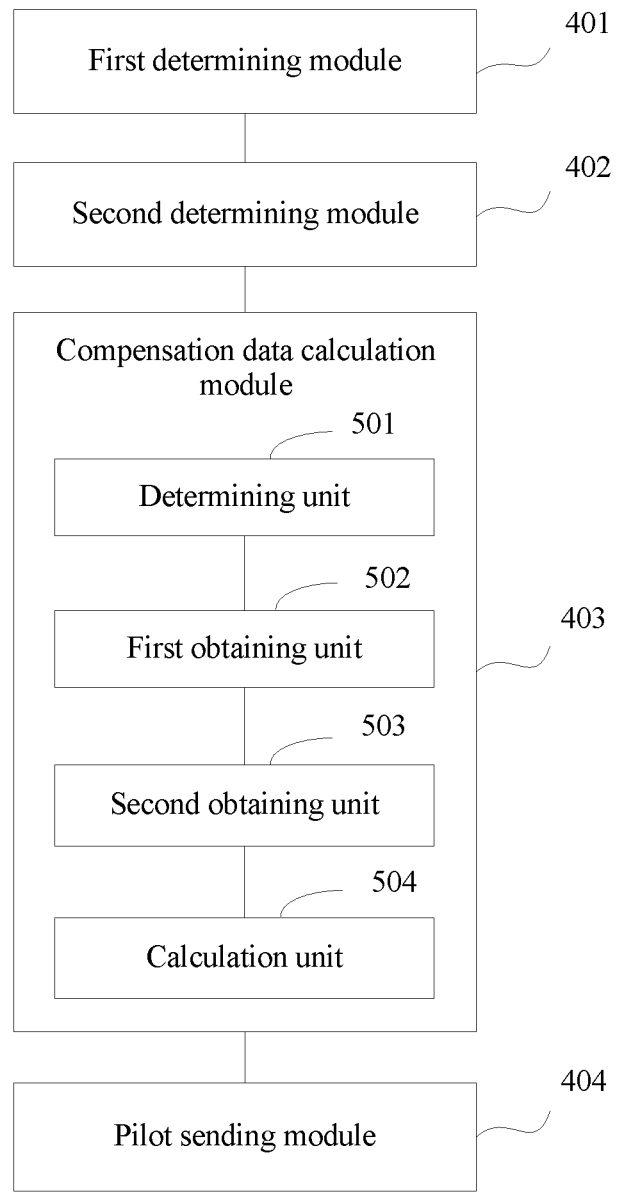
FIG. 5 is a schematic structural diagram of another embodiment of a data sending apparatus according to an embodiment of the present disclosure.

FIG. 5 shows a schematic structural diagram of another embodiment of a data sending apparatus according to an embodiment of the present disclosure. For a first determining module 401, a second determining module 402, a compensation data calculation module 403, and a pilot sending module 404, refer to the embodiment shown in FIG. 4. A difference from the embodiment shown in FIG. 4 lies in that the compensation data calculation module 403 may include:

a determining unit 501, configured to determine a communication data symbol sent at second time-frequency resource locations in the first set;

a first obtaining unit 502, configured to obtain a first interference coefficient matrix formed by interference coefficients of interference caused by the second time-frequency resource locations in the first set to the M first time-frequency resource locations;

a second obtaining unit 503, configured to obtain a second interference coefficient matrix formed by interference coefficients of interference caused by second time-frequency resource locations in the second set to the M first time-frequency resource locations; and a calculation unit 504, configured to obtain a compensation data symbol by means of calculation according to the communication data symbol, the first interference coefficient matrix, and the second interference coefficient matrix, so that interference of the communication data symbol to the pilot data symbol cancels out interference of the compensation data symbol to the pilot data symbol.

The calculation unit 504 may be specifically configured to obtain the compensation data symbol by means of calculation according to the communication data symbol, the first interference coefficient matrix, and the second interference coefficient matrix and according to the following calculation formula:

$$M_d d + M_c c = 0, \text{ where}$$

$M_d$ represents the first interference coefficient matrix, $M_c$ represents the second interference coefficient matrix, d represents a communication data symbol set in the first set, and c represents a compensation data symbol set in the second set.

A system may preset the first interference coefficient matrix and the second interference coefficient matrix according to the first time-frequency resource locations and the second time-frequency resource locations.

There may be multiple possible implementation manners of distribution of the first time-frequency resource locations and the second time-frequency resource locations. Therefore, the system may also preset interference coefficient matrices corresponding to multiple types of different distribution of the first time-frequency resource locations and the second time-frequency resource locations. In this way, when a pilot is sent, a corresponding first interference coefficient matrix and second interference coefficient matrix may be found according to currently determined first time-frequency resource locations and second time-frequency resource locations.

Certainly, the system may also separately construct the first interference coefficient matrix and the second interference coefficient matrix according to the currently determined first time-frequency resource locations and second time-frequency resource locations, and a multiplexing converter response or an interference coefficient table.

It should be noted that, time-frequency resource location distribution of the pilot data symbol, the communication data symbol, and the compensation data symbol is not specifically limited in the present disclosure. The distribution may be implemented according to FIG. 1a to FIG. 1e, or may certainly be implemented in another distribution manner, as long as it is ensured that both a quantity of communication data symbols and a quantity of compensation data symbols are equal to that of pilot data symbols.

The foregoing data sending apparatus described in the foregoing embodiment may be integrated in a device in actual application. The device may be a base station, a terminal, or the like in a multicarrier system. The multicarrier system may specifically refer to an FBMC system. The device on which the data sending apparatus in this embodiment of the present disclosure is deployed can obtain a relatively accurate channel estimation value, fully utilize a pilot resource, and avoid waste of the pilot resource.

Figure 6:
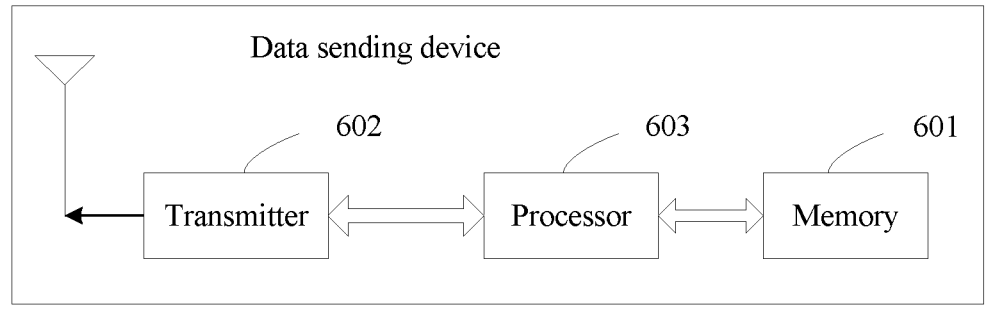
FIG. 6 is a schematic structural diagram of an embodiment of a data sending device according to an embodiment of the present disclosure.

It may be learned from the foregoing description that, a person skilled in the art may clearly understand that the present disclosure may be implemented by means of software plus a necessary commodity hardware platform. Therefore, referring to FIG. 6, an embodiment of the present disclosure further provides a data sending device, including a memory 601, a transmitter 602, and a processor 603.

The memory 601 stores a group of program instructions.

The processor 603 adjusts the program instructions stored in the memory 601, to execute the following operations:

determining, in a time-frequency resource, M first time-frequency resource locations and S second time-frequency resource locations in a preset neighborhood of the M first time-frequency resource locations, where S=2M;

determining, in the S second time-frequency resource locations, S/2 second time-frequency resource locations as a first set, and S/2 second time-frequency resource locations excluding the second time-frequency resource locations in the first set as a second set;

determining a communication data symbol sent at the second time-frequency resource locations in the first set, and calculating, according to the communication data symbol, a compensation data symbol sent at the second time-frequency resource locations in the second set, where interference of the communication data symbol to the pilot data symbol cancels out interference of the compensation data symbol to the pilot data symbol; and triggering the transmitter 602 to separately send the pilot data symbol at the M first time-frequency resource locations, send the communication data symbol at the second time-frequency resource locations in the first set, and send the compensation data symbol at the second time-frequency resource locations in the second set.

Figure 7:
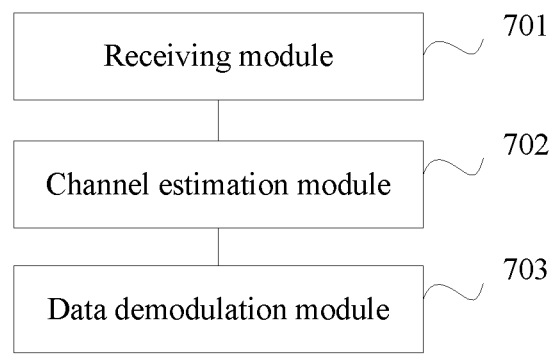
FIG. 7 is a schematic structural diagram of an embodiment of a data receiving apparatus according to an embodiment of the present disclosure.

FIG. 7 is a schematic structural diagram of a data receiving apparatus of an embodiment according to an embodiment of the present disclosure. The apparatus may include:

a receiving module 701, configured to receive a data symbol at a time-frequency resource location to which a pilot sequence is mapped, where the pilot sequence has M first time-frequency resource locations and S second time-frequency resource locations, the S second time-frequency resource locations are located in a preset neighborhood of the M first time-frequency resource locations, and S=2M; in the S second time-frequency resource locations, S/2 second time-frequency resource locations are a first set, and S/2 second time-frequency resource locations excluding the first location set are a second set; and a transmit end sends the pilot data symbol at the M first time-frequency resource locations, sends the communication data symbol at the S/2 second time-frequency resource locations in the first set, and sends the compensation data symbol at the S/2 second time-frequency resource locations in the second set, where interference of the communication data symbol to the pilot data symbol cancels out interference of the compensation data symbol to the pilot data symbol;

a channel estimation module 702, configured to perform channel estimation according to the received data symbol and the pilot data symbol, to obtain a channel estimation value; and a data demodulation module 703, configured to obtain, by using the channel estimation value and according to data obtained by means of demodulation at the second time-frequency resource locations in the first set and/or data obtained by means of demodulation at the second time-frequency resource locations in the second set, communication data corresponding to the communication data symbol.

By using the channel estimation value, a receive end may demodulate a data symbol that is received at a time-frequency resource location to which the communication data symbol is mapped, and obtained first demodulation data may be used as the communication data corresponding to the communication data symbol.

Alternatively, the receive end may demodulate a data symbol that is received at a time-frequency resource location to which the compensation data symbol is mapped, and obtain, by means of calculation according to obtained compensation demodulation data, the communication data corresponding to the communication data symbol.

That is, the receive end obtains a second demodulation data of the communication data symbol by means of calculation by using the compensation demodulation data, and interference coefficients of the communication data symbol and the compensation data symbol with respect to the pilot data symbol. The second demodulation data may also be used as the communication data corresponding to the communication data symbol sent by the transmit end.

Specifically, according to a relationship between the communication data symbol and the compensation data symbol $M_d d + M_c c = 0$, a relationship between the compensation demodulation data and the second demodulation data may be determined, that is:

$$M_d \tilde{d} + M_c \tilde{c} = 0, \text{ where}$$

$M_d$ represents a first interference coefficient matrix formed by interference coefficients of interference caused by the communication data symbol to the pilot data symbol, $M_c$ represents a second interference coefficient matrix formed by interference coefficients of interference caused by the compensation data symbol to the pilot data symbol, $\tilde{d}$ represents the second demodulation data, and $\tilde{c}$ represents the compensation demodulation data.

The first interference coefficient matrix and the second interference coefficient matrix may be preset by a system, or may be sent by the transmit end, or may be constructed by the receive end according to a received pilot sequence, and a multiplexing converter response or an interference coefficient table.

According to the compensation demodulation data obtained by means of demodulation, the second demodulation data may be obtained by means of calculation. The second demodulation data may also be used as the communication data corresponding to the communication data symbol.

To reduce impact of interference and noise, improve an SNR of received data, and improve system demodulation performance, in another possible implementation manner, the data demodulation module 703 may include:

a demodulation unit, configured to: by using the channel estimation value, separately obtain first demodulation data of the communication data symbol by means of demodulation at the second time-frequency resource locations in the first set, and obtain compensation demodulation data of the compensation data symbol by means of demodulation at the second time-frequency resource locations in the second set;

a first calculation unit, configured to obtain second demodulation data of the communication data symbol by means of calculation by using the compensation demodulation data, and interference coefficients of the communication data symbol and the compensation data symbol with respect to the pilot data symbol; and a second calculation unit, configured to perform weighted combination on the first demodulation data and the second demodulation data, to obtain the communication data corresponding to the communication data symbol.

A sum of weighted combination coefficients is 1. Generally, the weighted combination coefficients each may be ½. That is, the communication data is equal to a sum of ½ first demodulation data and ½ second demodulation data.

In this embodiment of the present disclosure, interference of a communication data symbol sent by a transmit end to a pilot data symbol cancels out interference of a compensation data symbol sent by the transmit end to the pilot data symbol, that is, a pilot interference term is 0, so that according to a received data symbol and the pilot data symbol, accurate channel estimation can be directly implemented to obtain an accurate channel estimation value.

In addition, by using a constructed pilot sequence, some communication data between the transmit end and a receive end may be transmitted, so that the some communication data sent by the transmit end can be demodulated according to the communication data symbol and the compensation data symbol in the pilot sequence, which improves data demodulation performance, fully utilizes a pilot resource, and can reduce pilot overheads to some extent.

The foregoing data receiving apparatus described in the foregoing embodiment may be integrated in a device in actual application. The device may be a base station, a terminal, or the like in a multicarrier system. The multicarrier system may specifically refer to an FBMC system. The device on which the data receiving apparatus in this embodiment of the present disclosure is deployed can obtain a relatively accurate channel estimation value, fully utilize a pilot resource, and avoid waste of the pilot resource.

Figure 8:
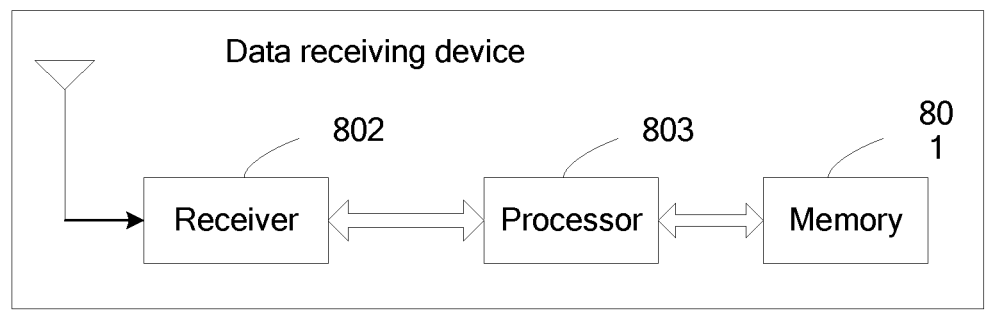
FIG. 8 is a schematic structural diagram of an embodiment of a data receiving apparatus according to an embodiment of the present disclosure.

It may be learned from the foregoing description that, a person skilled in the art may clearly understand that the present disclosure may be implemented by means of software plus a necessary commodity hardware platform. Therefore, referring to FIG. 8, an embodiment of the present disclosure further provides a data receiving device, including a memory 801, a receiver 802, and a processor 803.

The memory 801 is configured to store a group of program instructions.

The processor 803 is configured to call the program instructions stored in the memory 801, to execute the following operations:

triggering the receiver 802 to receive a data symbol at a time-frequency resource location to which a pilot sequence is mapped, where the pilot sequence has M first time-frequency resource locations and S second time-frequency resource locations, the S second time-frequency resource locations are located in a preset neighborhood of the M first time-frequency resource locations, and S=2M; in the S second time-frequency resource locations, S/2 second time-frequency resource locations are a first set, and S/2 second time-frequency resource locations excluding the first location set are a second set; and a transmit end sends the pilot data symbol at the M first time-frequency resource locations, sends the communication data symbol at the S/2 second time-frequency resource locations in the first set, and sends the compensation data symbol at the S/2 second time-frequency resource locations in the second set, where interference of the communication data symbol to the pilot data symbol cancels out interference of the compensation data symbol to the pilot data symbol;

performing channel estimation according to the received data symbol and the pilot data symbol, to obtain a channel estimation value; and obtaining, by using the channel estimation value and according to data obtained by means of demodulation at the second time-frequency resource locations in the first set and/or data obtained by means of demodulation at the second time-frequency resource locations in the second set, communication data corresponding to the communication data symbol.

The embodiments in this specification are all described in a progressive manner, each embodiment focuses on a difference from other embodiments, and for same or similar parts in the embodiments, refer to these embodiments. The apparatus disclosed in the embodiments is described relatively simply because it corresponds to the method disclosed in the embodiments, and for portions related to those of the method, refer to the description of the method.

Finally, it should be noted that in this specification, relational terms such as first and second are used only to differentiate an entity or operation from another entity or operation, and do not require or imply that any actual relationship or sequence exists between these entities or operations. Moreover, the terms "include", "contain", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

Embodiments of the present disclosure provide a data sending method and a data receiving method, so as to resolve a technical problem of inaccurate calculation of a channel estimation value.

To achieve this objective, the present disclosure provides the following technical solutions:

According to a first aspect, a data sending method is provided, including:

determining, in a time-frequency resource by a transmit end, M first time-frequency resource locations and S second time-frequency resource locations in a preset neighborhood of the M first time-frequency resource locations, where S=2M;

determining, in the S second time-frequency resource locations, S/2 second time-frequency resource locations as a first set, and S/2 second time-frequency resource locations excluding the second time-frequency resource locations in the first set as a second set;

determining a communication data symbol sent at the second time-frequency resource locations in the first set, and calculating, according to the communication data symbol, a compensation data symbol sent at the second time-frequency resource locations in the second set, where interference of the communication data symbol to the pilot data symbol cancels out interference of the compensation data symbol to the pilot data symbol; and separately sending the pilot data symbol at the M first time-frequency resource locations, sending the communication data symbol at the second time-frequency resource locations in the first set, and sending the compensation data symbol at the second time-frequency resource locations in the second set.

In a first possible implementation manner of the first aspect, the determining S second time-frequency resource locations in a preset neighborhood of the M first time-frequency resource locations includes:

determining the S second time-frequency resource locations that cause interference to the M first time-frequency resource locations.

With reference to the first possible implementation manner of the first aspect, a second possible implementation manner of the first aspect is further provided, and the determining the S time-frequency resource locations that cause interference to the M first time-frequency resource locations includes:

determining, according to a multiplexing converter response, the S second time-frequency resource locations in time-frequency resource locations corresponding to a first preset range of the multiplexing converter response of the M first time-frequency resource locations; or determining, according to an interference coefficient table, the S second time-frequency resource locations in time-frequency resource locations corresponding to a second preset range of the interference coefficient table of the M first time-frequency resource locations; or determining, according to a system preset parameter, the S time-frequency resource locations that cause interference to the M first time-frequency resource locations.

With reference to any one of the first aspect or the foregoing possible implementation manners of the first aspect, a third possible implementation manner of the first aspect is further provided, and the M first time-frequency resource locations are corresponding to N consecutive multicarrier symbols, and corresponding to M/N consecutive subcarriers; and the S second time-frequency resource locations are corresponding to T multicarrier symbols, and corresponding to S/T subcarriers, where the T multicarrier symbols are multicarrier symbols corresponding to numbers sequentially adjacent to numbers of the N consecutive multicarrier symbols, and M/N=S/T; or T=N, the T multicarrier symbols are the N multicarrier symbols, and in each multicarrier symbol, S/T subcarriers that are corresponding to second time-frequency resource locations are subcarriers corresponding to numbers sequentially adjacent to numbers of M/N subcarriers that are corresponding to first time-frequency resource locations.

With reference to any one of the first aspect or the foregoing possible implementation manners of the first aspect, a fourth possible implementation manner of the first aspect is further provided, and the calculating, according to the communication data symbol, a compensation data symbol sent in the second set includes:

obtaining a first interference coefficient matrix formed by interference coefficients of interference caused by the second time-frequency resource locations in the first set to the M first time-frequency resource locations;

obtaining a second interference coefficient matrix formed by interference coefficients of interference caused by the second time-frequency resource locations in the second set to the M first time-frequency resource locations; and obtaining the compensation data symbol by means of calculation according to the communication data symbol, the first interference coefficient matrix, and the second interference coefficient matrix, so that the interference of the communication data symbol to the pilot data symbol cancels out the interference of the compensation data symbol to the pilot data symbol.

With reference to the fourth possible implementation manner of the first aspect, a fifth possible implementation manner of the first aspect is further provided, and the obtaining the compensation data symbol by means of calculation according to the communication data symbol, the first interference coefficient matrix, and the second interference coefficient matrix includes:

obtaining the compensation data symbol by means of calculation according to the communication data symbol, the first interference coefficient matrix, and the second interference coefficient matrix and according to the following calculation formula:

$$M_d d + M_c c = 0, \text{ where}$$

$M_d$ represents the first interference coefficient matrix, $M_c$ represents the second interference coefficient matrix, d represents a communication data symbol set in the first set, and c represents a compensation data symbol set in the second set.

According to a second aspect, a data receiving method is provided, including:

receiving, by a receive end, a data symbol at a time-frequency resource location to which a pilot sequence is mapped, where the pilot sequence has M first time-frequency resource locations and S second time-frequency resource locations, the S second time-frequency resource locations are located in a preset neighborhood of the M first time-frequency resource locations, and S=2M; in the S second time-frequency resource locations, S/2 second time-frequency resource locations are a first set, and S/2 second time-frequency resource locations excluding the first location set are a second set; and a transmit end sends the pilot data symbol at the M first time-frequency resource locations, sends the communication data symbol at the S/2 second time-frequency resource locations in the first set, and sends the compensation data symbol at the S/2 second time-frequency resource locations in the second set, where interference of the communication data symbol to the pilot data symbol cancels out interference of the compensation data symbol to the pilot data symbol;

performing channel estimation according to the received data symbol and the pilot data symbol, to obtain a channel estimation value; and obtaining, by using the channel estimation value and according to data obtained by means of demodulation at the second time-frequency resource locations in the first set and/or data obtained by means of demodulation at the second time-frequency resource locations in the second set, communication data corresponding to the communication data symbol.

In a first possible implementation manner of the second aspect, the obtaining, by using the channel estimation value and according to data obtained by means of demodulation at the second time-frequency resource locations in the first set and/or data obtained by means of demodulation at the second time-frequency resource locations in the second set, communication data corresponding to the communication data symbol includes:

by using the channel estimation value, separately obtaining first demodulation data of the communication data symbol by means of demodulation at the second time-frequency resource locations in the first set, and obtaining compensation demodulation data of the compensation data symbol by means of demodulation at the second time-frequency resource locations in the second set;

obtaining second demodulation data of the communication data symbol by means of calculation by using the compensation demodulation data, and interference coefficients of the communication data symbol and the compensation data symbol with respect to the pilot data symbol; and performing weighted combination on the first demodulation data and the second demodulation data, to obtain the communication data corresponding to the communication data symbol.

With reference to the first possible implementation manner of the second aspect, a second possible implementation manner of the second aspect is further provided, and the obtaining second demodulation data of the communication data symbol by means of calculation by using the compensation demodulation data, and interference coefficients of the communication data symbol and the compensation data symbol with respect to the pilot data symbol includes:

obtaining the second demodulation data of the communication data symbol by means of calculation by using the compensation demodulation data, and the interference coefficients of the communication data symbol and the compensation data symbol with respect to the pilot data symbol according to the following calculation formula:

$$M_d \tilde{d} + M_c \tilde{c} = 0, \text{ where}$$

$M_d$ represents a first interference coefficient matrix formed by interference coefficients of interference caused by the communication data symbol to the pilot data symbol, $M_c$ represents a second interference coefficient matrix formed by interference coefficients of interference caused by the compensation data symbol to the pilot data symbol, $\tilde{d}$ represents the first demodulation data, and $\tilde{c}$ represents the compensation demodulation data.

According to a third aspect, a data sending apparatus is provided, including:

a first determining module, configured to determine, in a time-frequency resource, M first time-frequency resource locations and S second time-frequency resource locations in a preset neighborhood of the M first time-frequency resource locations, where S=2M;

a second determining module, configured to determine, in the S second time-frequency resource locations, S/2 second time-frequency resource locations as a first set, and S/2 second time-frequency resource locations excluding the second time-frequency resource locations in the first set as a second set;

a compensation data calculation module, configured to: determine a communication data symbol sent at the second time-frequency resource locations in the first set, and calculate, according to the communication data symbol, a compensation data symbol sent at the second time-frequency resource locations in the second set, where interference of the communication data symbol to the pilot data symbol cancels out interference of the compensation data symbol to the pilot data symbol; and a pilot sending module, configured to: separately send the pilot data symbol at the M first time-frequency resource locations, send the communication data symbol at the second time-frequency resource locations in the first set, and send the compensation data symbol at the second time-frequency resource locations in the second set.

In a first possible implementation manner of the third aspect, that the first determining module determines S second time-frequency resource locations in a preset neighborhood of the M first time-frequency resource locations is specifically:

determining the S second time-frequency resource locations that cause interference to the M first time-frequency resource locations.

With reference to the first possible implementation manner of the third aspect, a second possible implementation manner of the third aspect is further provided, and that the first determining module determines the S second time-frequency resource locations that cause interference to the M first time-frequency resource locations is specifically:

determining, according to a multiplexing converter response, the S second time-frequency resource locations in time-frequency resource locations corresponding to a first preset range of the multiplexing converter response of the M first time-frequency resource locations; or determining, according to an interference coefficient table, the S second time-frequency resource locations in time-frequency resource locations corresponding to a second preset range of the interference coefficient table of the M first time-frequency resource locations; or determining, according to a system preset parameter, the S time-frequency resource locations that cause interference to the M first time-frequency resource locations.

With reference to any one of the third aspect or the foregoing possible implementation manners of the third aspect, a third possible implementation manner of the third aspect is further provided, and the M first time-frequency resource locations are corresponding to N consecutive multicarrier symbols, and corresponding to M/N consecutive subcarriers; and the S second time-frequency resource locations are corresponding to T multicarrier symbols, and corresponding to S/T subcarriers, where the T multicarrier symbols are multicarrier symbols corresponding to numbers sequentially adjacent to numbers of the N consecutive multicarrier symbols, and M/N=S/T; or T=N, the T multicarrier symbols are the N multicarrier symbols, and in each multicarrier symbol, S/T subcarriers that are corresponding to second time-frequency resource locations are subcarriers corresponding to numbers sequentially adjacent to numbers of M/N subcarriers that are corresponding to first time-frequency resource locations.

With reference to any one of the third aspect or the foregoing possible implementation manners of the third aspect, a fourth possible implementation manner of the third aspect is further provided, and the compensation data calculation module includes:

a determining unit, configured to determine a communication data symbol sent at the second time-frequency resource locations in the first set;

a first obtaining unit, configured to obtain a first interference coefficient matrix formed by interference coefficients of interference caused by the second time-frequency resource locations in the first set to the M first time-frequency resource locations;

a second obtaining unit, configured to obtain a second interference coefficient matrix formed by interference coefficients of interference caused by the second time-frequency resource locations in the second set to the M first time-frequency resource locations; and a calculation unit, configured to obtain the compensation data symbol by means of calculation according to the communication data symbol, the first interference coefficient matrix, and the second interference coefficient matrix, so that the interference of the communication data symbol to the pilot data symbol cancels out the interference of the compensation data symbol to the pilot data symbol.

With reference to the fourth possible implementation manner of the third aspect, a fifth possible implementation manner of the third aspect is further provided, and the calculation unit is specifically configured to obtain the compensation data symbol by means of calculation according to the communication data symbol, the first interference coefficient matrix, and the second interference coefficient matrix and according to the following calculation formula:

$$M_d d + M_c c = 0, \text{ where}$$

$M_d$ represents the first interference coefficient matrix, $M_c$ represents the second interference coefficient matrix, d represents a communication data symbol set in the first set, and c represents a compensation data symbol set in the second set.

According to a fourth aspect, a data sending device is provided, including a memory, a transmitter, and a processor, where the memory stores a group of program instructions; and the processor adjusts the program instructions stored in the memory, to execute the following operations:

determining, in a time-frequency resource, M first time-frequency resource locations and S second time-frequency resource locations in a preset neighborhood of the M first time-frequency resource locations, where S=2M;

determining, in the S second time-frequency resource locations, S/2 second time-frequency resource locations as a first set, and S/2 second time-frequency resource locations excluding the second time-frequency resource locations in the first set as a second set;

determining a communication data symbol sent at the second time-frequency resource locations in the first set, and calculating, according to the communication data symbol, a compensation data symbol sent at the second time-frequency resource locations in the second set, where interference of the communication data symbol to the pilot data symbol cancels out interference of the compensation data symbol to the pilot data symbol; and triggering the transmitter to separately send the pilot data symbol at the M first time-frequency resource locations, send the communication data symbol at the second time-frequency resource locations in the first set, and send the compensation data symbol at the second time-frequency resource locations in the second set.

According to a fifth aspect, a data receiving apparatus is provided, including:

a receiving module, configured to receive a data symbol at a time-frequency resource location to which a pilot sequence is mapped, where the pilot sequence has M first time-frequency resource locations and S second time-frequency resource locations, the S second time-frequency resource locations are located in a preset neighborhood of the M first time-frequency resource locations, and S=2M; in the S second time-frequency resource locations, S/2 second time-frequency resource locations are a first set, and S/2 second time-frequency resource locations excluding the first location set are a second set; and a transmit end sends the pilot data symbol at the M first time-frequency resource locations, sends the communication data symbol at the S/2 second time-frequency resource locations in the first set, and sends the compensation data symbol at the S/2 second time-frequency resource locations in the second set, where interference of the communication data symbol to the pilot data symbol cancels out interference of the compensation data symbol to the pilot data symbol;

a channel estimation module, configured to perform channel estimation according to the received data symbol and the pilot data symbol, to obtain a channel estimation value; and a data demodulation module, configured to obtain, by using the channel estimation value and according to data obtained by means of demodulation at the second time-frequency resource locations in the first set and/or data obtained by means of demodulation at the second time-frequency resource locations in the second set, communication data corresponding to the communication data symbol.

In a first possible implementation manner of the fifth aspect, the data demodulation module includes:

a demodulation unit, configured to: by using the channel estimation value, separately obtain first demodulation data of the communication data symbol by means of demodulation at the second time-frequency resource locations in the first set, and obtain compensation demodulation data of the compensation data symbol by means of demodulation at the second time-frequency resource locations in the second set;

a first calculation unit, configured to obtain second demodulation data of the communication data symbol by means of calculation by using the compensation demodulation data, and interference coefficients of the communication data symbol and the compensation data symbol with respect to the pilot data symbol; and a second calculation unit, configured to perform weighted combination on the first demodulation data and the second demodulation data, to obtain the communication data corresponding to the communication data symbol.

With reference to the first possible implementation manner of the fifth aspect, a second possible implementation manner of the fifth aspect is further provided, and the first calculation unit is specifically configured to obtain the second demodulation data of the communication data symbol by means of calculation by using the compensation demodulation data, and the interference coefficients of the communication data symbol and the compensation data symbol with respect to the pilot data symbol according to the following calculation formula:

$$M_d \tilde{d} + M_c \tilde{c} = 0, \text{ where}$$

$M_d$ represents a first interference coefficient matrix formed by interference coefficients of interference caused by the communication data symbol to the pilot data symbol, $M_c$ represents a second interference coefficient matrix formed by interference coefficients of interference caused by the compensation data symbol to the pilot data symbol, $\tilde{d}$ represents the first demodulation data, and $\tilde{c}$ represents the compensation demodulation data.

According to a sixth aspect, a data receiving device is provided, including a memory, a receiver, and a processor, where the memory stores a group of program instructions; and the processor is configured to adjust the program instructions stored in the memory, to execute the following operations:

triggering the receiver to receive a data symbol at a time-frequency resource location to which a pilot sequence is mapped, where the pilot sequence has M first time-frequency resource locations and S second time-frequency resource locations, the S second time-frequency resource locations are located in a preset neighborhood of the M first time-frequency resource locations, and S=2M; in the S second time-frequency resource locations, S/2 second time-frequency resource locations are a first set, and S/2 second time-frequency resource locations excluding the first location set are a second set; and a transmit end sends the pilot data symbol at the M first time-frequency resource locations, sends the communication data symbol at the S/2 second time-frequency resource locations in the first set, and sends the compensation data symbol at the S/2 second time-frequency resource locations in the second set, where interference of the communication data symbol to the pilot data symbol cancels out interference of the compensation data symbol to the pilot data symbol;

performing channel estimation according to the received data symbol and the pilot data symbol, to obtain a channel estimation value; and obtaining, by using the channel estimation value and according to data obtained by means of demodulation at the second time-frequency resource locations in the first set and/or data obtained by means of demodulation at the second time-frequency resource locations in the second set, communication data corresponding to the communication data symbol.

In the embodiments of the present disclosure, M first time-frequency resource locations and S second time-frequency resource locations in a preset neighborhood of the M first time-frequency resource locations are determined; a pilot data symbol is sent at the M first time-frequency resource locations; and a communication data symbol is sent at second time-frequency resource locations in a first set in the S second time-frequency resource locations, and a compensation data symbol is sent at second time-frequency resource locations in a second set in the S second time-frequency resource locations, where interference of the communication data symbol to the pilot data symbol cancels out interference of the compensation data symbol to the pilot data symbol. In this way, during channel estimation, because the interference of the communication data symbol to the pilot data symbol cancels out the interference of the compensation data symbol to the pilot data symbol, a pilot interference term is 0, so that a receive end can obtain a clean data symbol, and can directly obtain an accurate channel estimation value according to the received data symbol and the pilot data symbol. In addition, by using a constructed pilot sequence, some communication data may be transmitted, so that the some communication data sent by a transmit end can be demodulated according to the communication data symbol and the compensation data symbol in the pilot sequence, which improves data demodulation performance.

For ease of description, the foregoing apparatus is described by dividing the functions into various units. Certainly, during implementation of the present disclosure, the functions of each unit may be implemented in a same piece of or a plurality of pieces of software and/or hardware.

According to the descriptions of the embodiments, a person skilled in the art may clearly understand that the present disclosure may be implemented by software and necessary universal hardware. Based on such an understanding, the technical solutions of the present disclosure essentially or the part may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present disclosure.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

The foregoing descriptions of the disclosed embodiments enable a person skilled in the art to implement or use the present disclosure. Various modifications to these embodiments will be obvious to a person skilled in the art, and the general principles defined in this specification may also be implemented in other embodiments without departing from the scope of the embodiments of the present disclosure. Therefore, the present disclosure will not be limited to the embodiments described in this specification but extends to the widest scope that complies with the principles and novelty disclosed in this specification.

What is claimed is:

1. A data sending method, comprising:
   determining, by a transmit end in a time-frequency resource, M first time-frequency resource locations and S second time-frequency resource locations in a preset neighborhood of the M first time-frequency resource locations, wherein S=2M;
   determining, in the S second time-frequency resource locations, S/2 second time-frequency resource locations as a first set, and S/2 second time-frequency resource locations excluding the second time-frequency resource locations in the first set as a second set;
   determining a communication data symbol sent at the second time-frequency resource locations in the first set, and calculating, according to the communication data symbol, a compensation data symbol sent at the second time-frequency resource locations in the second set, wherein interference of the communication data symbol to the pilot data symbol cancels out interference of the compensation data symbol to the pilot data symbol; and
   separately sending the pilot data symbol at the M first time-frequency resource locations, sending the communication data symbol at the second time-frequency resource locations in the first set, and sending the compensation data symbol at the second time-frequency resource locations in the second set.

2. The method according to claim 1, wherein the determining S second time-frequency resource locations in the preset neighborhood of the M first time-frequency resource locations comprises:
   determining the S second time-frequency resource locations that cause interference to the M first time-frequency resource locations.

3. The method according to claim 2, wherein the determining the S second time-frequency resource locations that cause the interference to the M first time-frequency resource locations comprises:
   determining, according to a multiplexing converter response, the S second time-frequency resource locations in time-frequency resource locations corresponding to a first preset range of the multiplexing converter response of the M first time-frequency resource locations; or
   determining, according to an interference coefficient table, the S second time-frequency resource locations in time-frequency resource locations corresponding to a second preset range of the interference coefficient table of the M first time-frequency resource locations; or
   determining, according to a system preset parameter, the S second time-frequency resource locations that cause the interference to the M first time-frequency resource locations.

4. The method according to claim 1, wherein the M first time-frequency resource locations are corresponding to N consecutive multicarrier symbols, and corresponding to M/N consecutive subcarriers; and
   the S second time-frequency resource locations are corresponding to T multicarrier symbols, and corresponding to S/T subcarriers, wherein
   the T multicarrier symbols are multicarrier symbols corresponding to numbers sequentially adjacent to numbers of the N consecutive multicarrier symbols, and M/N=S/T; or
   T=N, the T multicarrier symbols are the N multicarrier symbols, and in each multicarrier symbol, S/T subcarriers that are corresponding to the S second time-frequency resource locations are subcarriers corresponding to numbers sequentially adjacent to numbers of M/N subcarriers that are corresponding to the M first time-frequency resource locations.

5. The method according to claim 1, wherein the calculating, according to the communication data symbol, the compensation data symbol sent in the second set comprises:
   obtaining a first interference coefficient matrix formed by interference coefficients of interference caused by the second time-frequency resource locations in the first set to the M first time-frequency resource locations;
   obtaining a second interference coefficient matrix formed by interference coefficients of interference caused by the second time-frequency resource locations in the second set to the M first time-frequency resource locations; and
   obtaining the compensation data symbol by means of calculation according to the communication data symbol, the first interference coefficient matrix, and the second interference coefficient matrix, so that the interference of the communication data symbol to the pilot data symbol cancels out the interference of the compensation data symbol to the pilot data symbol.

6. The method according to claim 5, wherein the obtaining the compensation data symbol by the means of calculation according to the communication data symbol, the first interference coefficient matrix, and the second interference coefficient matrix comprises:
   obtaining the compensation data symbol by the means of calculation according to the communication data symbol, the first interference coefficient matrix, and the second interference coefficient matrix and according to the following calculation formula:

$$M_d d + M_c c = 0, \text{ wherein}$$

$M_d$ represents the first interference coefficient matrix, $M_c$ represents the second interference coefficient matrix, d represents a communication data symbol set in the first set, and c represents a compensation data symbol set in the second set.

7. A data receiving method, comprising:
receiving, by a receive end, a data symbol at a time-frequency resource location to which a pilot sequence is mapped, wherein the pilot sequence has M first time-frequency resource locations and S second time-frequency resource locations, the S second time-frequency resource locations are located in a preset neighborhood of the M first time-frequency resource locations, and S=2M; in the S second time-frequency resource locations, S/2 second time-frequency resource locations are a first set, and S/2 second time-frequency resource locations excluding the first set are a second set; and a transmit end sends a pilot data symbol at the M first time-frequency resource locations, sends a communication data symbol at the S/2 second time-frequency resource locations in the first set, and sends a compensation data symbol at the S/2 second time-frequency resource locations in the second set, wherein interference of the communication data symbol to the pilot data symbol cancels out interference of the compensation data symbol to the pilot data symbol;
performing channel estimation according to the received data symbol and the pilot data symbol, to obtain a channel estimation value; and
obtaining, by using the channel estimation value and according to data obtained by means of demodulation at the second time-frequency resource locations in the first set and/or data obtained by means of demodulation at the second time-frequency resource locations in the second set, communication data corresponding to the communication data symbol.

8. The method according to claim 7, wherein the obtaining, by using the channel estimation value and according to the data obtained by the means of demodulation at the second time-frequency resource locations in the first set and/or data obtained by the means of demodulation at the second time-frequency resource locations in the second set, the communication data corresponding to the communication data symbol comprises:
by using the channel estimation value, separately obtaining first demodulation data of the communication data symbol by means of demodulation at the second time-frequency resource locations in the first set, and obtaining compensation demodulation data of the compensation data symbol by means of demodulation at the second time-frequency resource locations in the second set;
obtaining second demodulation data of the communication data symbol by means of calculation by using the compensation demodulation data, and interference coefficients of the communication data symbol and the compensation data symbol with respect to the pilot data symbol; and
performing weighted combination on the first demodulation data and the second demodulation data, to obtain the communication data corresponding to the communication data symbol.

9. The method according to claim 8, wherein the obtaining the second demodulation data of the communication data symbol by the means of calculation by using the compensation demodulation data, and the interference coefficients of the communication data symbol and the compensation data symbol with respect to the pilot data symbol comprises:
obtaining the second demodulation data of the communication data symbol by means of calculation by using the compensation demodulation data, and the interference coefficients of the communication data symbol and the compensation data symbol with respect to the pilot data symbol according to the following calculation formula:

$M_d \tilde{d} + M_c \tilde{c} = 0$, wherein $M_d$ represents a first interference coefficient matrix formed by interference coefficients of interference caused by the communication data symbol to the pilot data symbol, $M_c$ represents a second interference coefficient matrix formed by interference coefficients of interference caused by the compensation data symbol to the pilot data symbol, $\tilde{d}$ represents the first demodulation data, and $\tilde{c}$ represents the compensation demodulation data.

10. A data device, comprising a memory, a transmitter, and a processor, wherein
the memory stores a group of program instructions; and
the processor invokes the program instructions stored in the memory, to execute the following operations:
determining, in a time-frequency resource, M first time-frequency resource locations and S second time-frequency resource locations in a preset neighborhood of the M first time-frequency resource locations, wherein S=2M;
determining, in the S second time-frequency resource locations, S/2 second time-frequency resource locations as a first set, and S/2 second time-frequency resource locations excluding the second time-frequency resource locations in the first set as a second set;
determining a communication data symbol sent at the second time-frequency resource locations in the first set, and calculating, according to the communication data symbol, a compensation data symbol sent at the second time-frequency resource locations in the second set, wherein interference of the communication data symbol to the pilot data symbol cancels out interference of the compensation data symbol to the pilot data symbol; and
triggering the transmitter to separately send the pilot data symbol at the M first time-frequency resource locations, send the communication data symbol at the second time-frequency resource locations in the first set, and send the compensation data symbol at the second time-frequency resource locations in the second set.

11. The data device according to claim 10, wherein the processor is specifically configured to:
determine the S second time-frequency resource locations that cause interference to the M first time-frequency resource locations.

12. The data device according to claim 11, wherein the processor is specifically configured to:
determine, according to a multiplexing converter response, the S second time-frequency resource locations in time-frequency resource locations corresponding to a first preset range of the multiplexing converter response of the M first time-frequency resource locations; or
determine, according to an interference coefficient table, the S second time-frequency resource locations in time-frequency resource locations corresponding to a second preset range of the interference coefficient table of the M first time-frequency resource locations; or
determine, according to a system preset parameter, the S second time-frequency resource locations that cause interference to the M first time-frequency resource locations.

13. The data device according to claim 10, wherein the M first time-frequency resource locations are corresponding to N consecutive multicarrier symbols, and corresponding to M/N consecutive subcarriers; and the S second time-frequency resource locations are corresponding to T multicarrier symbols, and corresponding to S/T subcarriers, wherein the T multicarrier symbols are multicarrier symbols corresponding to numbers sequentially adjacent to numbers of the N consecutive multicarrier symbols, and M/N=S/T; or T=N, the T multicarrier symbols are the N multicarrier symbols, and in each multicarrier symbol, S/T subcarriers that are corresponding to the S second time-frequency resource locations are subcarriers corresponding to numbers sequentially adjacent to numbers of M/N subcarriers that are corresponding to the M first time-frequency resource locations.

14. The data device according to claim 10, wherein the processor is configure to:

determine a communication data symbol sent at the second time-frequency resource locations in the first set;

obtain a first interference coefficient matrix formed by interference coefficients of interference caused by the second time-frequency resource locations in the first set to the M first time-frequency resource locations;

obtain a second interference coefficient matrix formed by interference coefficients of interference caused by the second time-frequency resource locations in the second set to the M first time-frequency resource locations; and obtain the compensation data symbol by means of calculation according to the communication data symbol, the first interference coefficient matrix, and the second interference coefficient matrix, so that the interference of the communication data symbol to the pilot data symbol cancels out the interference of the compensation data symbol to the pilot data symbol.

15. The data device according to claim 14, wherein the processor is specifically configured to obtain the compensation data symbol by means of calculation according to the communication data symbol, the first interference coefficient matrix, and the second interference coefficient matrix and according to the following calculation formula:

$M_d d + M_c c = 0$, wherein $M_d$ represents the first interference coefficient matrix, $M_c$ represents the second interference coefficient matrix, d represents a communication data symbol set in the first set, and c represents a compensation data symbol set in the second set.

* * * * *